(12) United States Patent
Muto

(10) Patent No.: US 6,996,611 B1
(45) Date of Patent: Feb. 7, 2006

(54) SYSTEM FOR SEARCHING FOR APPARATUS CONNECTED TO NETWORK AND APPARATUS EMPLOYED BY SAME SYSTEM, AND CONTROL METHOD THEREFOR

(75) Inventor: Shin Muto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 697 days.

(21) Appl. No.: 09/625,842

(22) Filed: Jul. 26, 2000

(30) Foreign Application Priority Data

Jul. 30, 1999 (JP) .......................................... 11-218082
Jul. 6, 2000 (JP) ....................................... 2000-204754

(51) Int. Cl.
*G06F 15/173* (2006.01)
*G06F 3/00* (2006.01)
*G06F 15/00* (2006.01)

(52) U.S. Cl. ........................... 709/223; 709/224; 710/8; 710/10; 358/1.13

(58) Field of Classification Search ................. 345/734, 345/733; 709/223, 224, 232; 710/8, 9, 10; 358/1.13, 448
See application file for complete search history.

(56) References Cited

U.S. PATENT DOCUMENTS

| | | | | |
|---|---|---|---|---|
| 5,586,254 A | * | 12/1996 | Kondo et al. .................. 714/25 |
| 5,796,951 A | * | 8/1998 | Hamner et al. .............. 709/223 |
| 5,910,803 A | * | 6/1999 | Grau et al. .................. 345/734 |
| 6,041,349 A | * | 3/2000 | Sugauchi et al. ........... 709/223 |
| 6,046,742 A | * | 4/2000 | Chari .......................... 345/734 |
| 6,049,827 A | * | 4/2000 | Sugauchi et al. ........... 709/223 |
| 6,076,106 A | * | 6/2000 | Hamner et al. ............. 709/223 |
| 6,131,120 A | * | 10/2000 | Reid ........................... 709/225 |
| 6,181,341 B1 | * | 1/2001 | Shinagawa .................. 345/734 |
| 6,212,558 B1 | * | 4/2001 | Antur et al. ................ 709/221 |
| 6,266,663 B1 | * | 7/2001 | Fuh et al. ....................... 707/4 |
| 6,289,380 B1 | * | 9/2001 | Battat et al. ................ 709/224 |
| 6,347,336 B1 | * | 2/2002 | Song et al. ................. 709/223 |
| 6,374,293 B1 | * | 4/2002 | Dev et al. ................... 709/220 |
| 6,393,478 B1 | * | 5/2002 | Bahlmann ................... 709/224 |
| 6,473,794 B1 | * | 10/2002 | Guheen et al. ............. 709/223 |
| 6,496,820 B1 | * | 12/2002 | Tada et al. ..................... 707/5 |
| 6,523,696 B1 | * | 2/2003 | Saito et al. ................. 709/223 |
| 6,553,431 B1 | | 4/2003 | Yamamoto et al. ............ 710/8 |
| 2002/0113816 A1 | * | 8/2002 | Mitchell et al. ............. 345/734 |
| 2003/0115199 A1 | | 6/2003 | Ochiai et al. ................. 707/10 |

FOREIGN PATENT DOCUMENTS

| | | |
|---|---|---|
| EP | 0614151 | 9/1994 |
| EP | 656581 | 6/1995 |
| EP | 1067731 | 1/2001 |
| JP | 10-187390 | 7/1998 |

OTHER PUBLICATIONS

U.S. Appl. No. 09/570,407, filed May 12, 2000.
U.S. Appl. No. 09/576,245, filed May 24, 2000.
U.S. Appl. No. 09/612,565, filed Jul. 7, 2000.
U.S. Appl. No. 09/612,946, filed Jul. 10, 2000.
U.S. Appl. No. 10/683,102.

* cited by examiner

*Primary Examiner*—Krisna Lim
(74) *Attorney, Agent, or Firm*—Fitzpatrick, Cella, Harper & Scinto

(57) ABSTRACT

The results obtained by searching for the apparatuses in a system are displayed by representing the hierarchical locations of the apparatuses, so that a user can easily identify the locations of the apparatuses. Further, based on a user of an apparatus to be searched for, the search for the apparatus is performed in accordance with its hierarchical location. And when a search for an apparatus is to be based on its hierarchical location, selected as the search results are map data that appropriately represent the hierarchical location of the apparatus.

14 Claims, 42 Drawing Sheets

FIG. 9

| | | | | | |
|---|---|---|---|---|---|
| 801 — NM | LBP1110 | MFP6550 | LBP3310 | LBP3310 | SCN2160 |
| 802 — MAP | 10X+10Y | 5X+30Y | 10X+10Y | 15X+25Y | 5X+5Y |
| 803 — DV | PRINTER | MFP | PRINTER | PRINTER | SCANER |
| 804 — BL | 2-1 | 2-1 | 2-2 | 1-1 | 1-2 |
| 805 — FL | 2F | 2F | 2F | 1F | 1F |
| 806 — BU | AA BUILDING | AA BUILDING | AA BUILDING | AA BUILDING | AA BUILDING |
| 807 — OP | EXTEND | EXTEND | EXTEND | EXTEND | EXTEND |
| 808 — BR | TOKYO BRANCH | TOKYO BRANCH | TOKYO BRANCH | TOKYO BRANCH | TOKYO BRANCH |
| 809 — O | ABC TRADING COMPANY | ABC TRADING COMPANY | ABC TRADING COMPANY | ABC TRADING COMPANY | ABC TRADING COMPANY |
| 810 — C | JP | JP | JP | JP | JP |
| 811 — COLOR | OK | NG | NG | NG | OK |
| 812 — IP ADDRESS | 192.1.2.1 | 192.1.2.10 | 192.1.2.100 | 192.1.2.101 | 192.1.2.200 |
| 813 — CHARGE | ¥5/SHEET | ¥3/SHEET | NONE | ¥10/SHEET | NONE |
| 814 — GUEST USE | NG | OK | OK | OK | NG |

| | | |
|---|---|---|
| 901 | LOCATION INFORMATION TAG | |
| 902 | NM | LBP1110 |
| 903 | MAP | 10X+10Y |
| 904 | DV | PRINTER |
| 905 | BL | 2-1 |
| 906 | FL | 2F |
| 907 | BU | AA BUILDING |
| 908 | OP | EXTEND |
| 909 | BR | TOKYO BRANCH |
| 910 | O | ABC TRADING COMPANY |
| 911 | C | JP |
| 912 | DEVICE ATTRIBUTE TAG | |
| 913 | COLOR | OK |
| 914 | IP ADDRESS | 192.1.2.1 |
| 915 | CHARGE | ¥5/SHEET |
| 916 | GUEST USE | NG |

FIG. 11

| | | |
|---|---|---|
| 701 | LOCATION INFORMATION TAG | |
| 702 | NM | pc113 |
| 703 | MAP | 5X+5Y |
| 704 | DV | PC |
| 705 | BL | 1-1 |
| 706 | FL | 1F |
| 707 | BU | AA BUILDING |
| 708 | OP | EXTEND |
| 709 | BR | TOKYO BRANCH |
| 710 | O | ABC TRADING COMPANY |
| 711 | C | JP |
| 712 | CLIENT ATTRIBUTE INFORMATION TAG | |
| 713 | OWNER | GUEST |

FIG. 15

| NM | LBP1110 |
| MAP | 10X+10Y |
| DV | PRINTER |
| BL | 2-1 |
| COLOR | OK |
| IP ADDRESS | 192.1.2.1 |
| CHARGE | ¥5/SHEET |

FIG. 16

| NM | LBP1110 |
| MAP | 10X+10Y |
| DV | PRINTER |
| BL | 2-1 |
| FL | 2F |
| COLOR | OK |
| IP ADDRESS | 192.1.2.1 |
| CHARGE | ¥5/SHEET |

FIG. 17

C=JP, O=ABC TRADING COMPANY, BR=TOKYO BRANCH, OP=EXTEND, BU=AA BUILDING  1401

1402  1403

| BL | BITMAP |
|---|---|
| 1-1 | FIG. 18 |
| 1-2 | FIG. 19 |
| 2-1 | FIG. 20 |
| 2-2 | FIG. 21 |
| OTHER | FIG. 22 |

FIG. 23
| NM | BITMAP |
|---|---|
| MFP6550 | 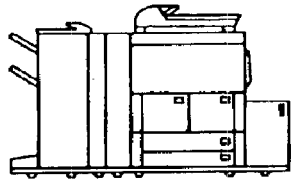 |
| LBP1110 |  |
| LBP3310 | 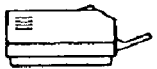 |
| SCN2160 |  |
| PC5330 |  |
| NOTE5133 |  |
| GY33115 | 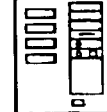 |
| PC6450 | 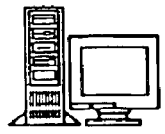 |
| UNKOWN | 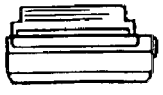 |

FIG. 33

| | | | | | |
|---|---|---|---|---|---|
| C | | | | | |
| O | ABC TRADING COMPANY | ABC TRADING COMPANY | ABC TRADING COMPANY | ABC TRADING COMPANY | ABC TRADING COMPANY |
| BR | | TOKYO BRANCH | TOKYO BRANCH | TOKYO BRANCH | TOKYO BRANCH |
| OP | | EXTEND | EXTEND | EXTEND | EXTEND |
| BU | | | AA BUILDING | AA BUILDING | AA BUILDING |
| FL | | | | 2F | 1F |
| BL | | | | | |
| MAP | | | | | |
| CORRESPONDING MAP | FIG. 33 | FIG. 35 | FIG. 37 | FIG. 39 | FIG. 41 |

| | | | | | |
|---|---|---|---|---|---|
| C | JP | JP | JP | JP | — |
| O | ABC TRADING COMPANY | ABC TRADING COMPANY | ABC TRADING COMPANY | ABC TRADING COMPANY | — |
| BR | TOKYO BRANCH | TOKYO BRANCH | TOKYO BRANCH | TOKYO BRANCH | — |
| OP | EXTEND | EXTEND | EXTEND | EXTEND | — |
| BU | AA BUILDING | AA BUILDING | AA BUILDING | AA BUILDING | — |
| FL | 1F | 1F | 2F | 2F | — |
| BL | 1-1 | 1-2 | 2-1 | 2-2 | |
| MAP | | | | | |
| CORRESPONDING MAP | FIG. 18 | FIG. 19 | FIG. 20 | FIG. 21 | FIG. 22 |

FIG. 48

| USER ID | RANK |
|---|---|
| ID1 | A |
| ID2 | A |
| ID3 | C |
| ID4 | B |
| ⋮ | ⋮ |
| UNREGISTERED ID | GUEST |

A>B>C>GUEST

FIG. 49

| | | | | 800 | |
|---|---|---|---|---|---|
| 801 NM | LBP1110 | MFP6550 | LBP3310 | LBP3310 | SCN2160 |
| 802 MAP | 10X+10Y | 5X+30Y | 10X+10Y | 15X+25Y | 5X+5Y |
| 803 DV | PRINTER | MFP | PRINTER | PRINTER | SCANER |
| 804 BL | 2-1 | 2-1 | 2-2 | 1-1 | 1-2 |
| 805 FL | 2F | 2F | 2F | 1F | 1F |
| 806 BU | AA BUILDING | AA BUILDING | AA BUILDING | AA BUILDING | AA BUILDING |
| 807 OP | EXTEND | EXTEND | EXTEND | EXTEND | EXTEND |
| 808 BR | TOKYO BRANCH | TOKYO BRANCH | TOKYO BRANCH | TOKYO BRANCH | TOKYO BRANCH |
| 809 O | ABC TRADING COMPANY | ABC TRADING COMPANY | ABC TRADING COMPANY | ABC TRADING COMPANY | ABC TRADING COMPANY |
| 810 C | JP | JP | JP | JP | JP |
| 811 COLOR | OK | NG | NG | NG | OK |
| 812 IP ADDRESS | 192.1.2.1 | 192.1.2.10 | 192.1.2.100 | 192.1.2.101 | 192.1.2.200 |
| 813 CHARGE | ¥5/SHEET | ¥3/SHEET | NONE | ¥10/SHEET | NONE |
| 814 AVAILABLE ID | B | C | A | GUEST | C |

FIG. 50

| | | | | | |
|---|---|---|---|---|---|
| C | | | | | |
| O | | JP | JP | JP | JP |
| BR | ABC TRADING COMPANY | ABC TRADING COMPANY | ABC TRADING COMPANY | ABC TRADING COMPANY | ABC TRADING COMPANY |
| OP | TOKYO BRANCH | TOKYO BRANCH | TOKYO BRANCH | TOKYO BRANCH | TOKYO BRANCH |
| BU | | EXTEND | EXTEND | EXTEND | EXTEND |
| FL | AA BUILDING | | AA BUILDING | AA BUILDING | AA BUILDING |
| BL | 1F | | | 2F | 1F |
| MAP | 1-1 | | | | |
| | | | | | |
| CORRESPONDING MAP | FIG. 18 | FIG. 33 | FIG. 35 | FIG. 37 | FIG. 39 | FIG. 41 |
| SEARCHABLE ID | GUEST | A | A | B | C | C |

| | | | | |
|---|---|---|---|---|
| C | | | | |
| O | JP | JP | JP | |
| BR | ABC TRADING COMPANY | ABC TRADING COMPANY | ABC TRADING COMPANY | |
| OP | TOKYO BRANCH | TOKYO BRANCH | TOKYO BRANCH | |
| BU | EXTEND | EXTEND | EXTEND | |
| FL | AA BUILDING | AA BUILDING | AA BUILDING | |
| BL | 1F | 2F | 2F | |
| MAP | 1-2 | 2-1 | 2-2 | |
| | | | | |
| CORRESPONDING MAP | FIG. 19 | FIG. 20 | FIG. 21 | FIG. 22 |
| SEARCHABLE ID | C | C | C | |

SYSTEM FOR SEARCHING FOR APPARATUS CONNECTED TO NETWORK AND APPARATUS EMPLOYED BY SAME SYSTEM, AND CONTROL METHOD THEREFOR

BACKGROUND OF THE INVENTION

1. Field of the Invention

The present invention relates to a search for an apparatus that is connected to a network, and the display of the search results.

2. Related Background Art

Conventionally, so-called directory services have been provided as methods for efficiently locating and utilizing various resources, such as printers, servers, terminals and scanners, that are connected to a network.

A directory service, which is used for the storage of a variety of data, is much like a telephone book, but a telephone book that is intended for use with a network. A specific example of a directory system that employs a directory service is the LDAP (Lightweight Directory Access Protocol). The operating instructions for the LDAP are written in the RFC (Request For Comments) 1777, a standard set of specifications issued by the IETF (Internet Engineering Task Force).

When a directory service is employed to search for a terminal device connected to a network, for example, a list of addresses can be obtained for those terminal devices on the network that are available for use.

However, conventionally, it is not possible to perform a hierarchial location information search for a terminal device that is to be used. Further, the results provided by a search based on hierarchial location information can not be displayed so that they can be easily understood by a user. For a network printer, an example terminal device, the progress of a search initiated by a question, such as "Where is the nearest printer on the current floor?" or "Where is a color image printer located in a pertinent building?", can not be displayed for easy viewing on a client terminal.

SUMMARY OF THE INVENTION

It is one objective of the present invention to display the results obtained by a search performed by an apparatus on a network, so that a user can easily understand them.

It is another objective of the present invention to search for the hierarchial location of an apparatus on a network, and to hierarchically display the results provided by the search.

It is an additional objective of the present invention to perform a search for an apparatus on a network based on the attributes of a user.

Other objectives of the present invention will become readily apparent during the course of the subsequent explanation, given while referring to the following embodiments and the accompanying drawings.

BRIEF DESCRIPTION OF THE DRAWINGS

FIG. 9 is a diagram showing hierarchial location information and attribute information that are managed by a server terminal according to the first embodiment of the present invention;

FIG. 10 is a diagram showing hierarchial location information and attribute information that are registered by the device terminal according to the first embodiment of the present invention;

FIG. 11 is a diagram showing hierarchial location information and attribute information for a client terminal according to the first embodiment of the present invention;

FIG. 15 is a diagram showing the results obtained by a search for a device terminal according to the first embodiment of the present invention;

FIG. 16 is a diagram showing the results obtained by a search for a device terminal according to the first embodiment of the present invention;

FIG. 17 is a diagram showing a bit map and hierarchial location information that are managed by a client terminal according to the first embodiment of the present invention;

FIG. 23 is a diagram showing a device terminal bit map that is managed by the device terminal according to the first embodiment of the present invention;

FIG. 33 is a diagram showing a MAP listing, according to the first embodiment of the present invention, that corresponds to each hierarchial class that is searched for;

FIG. 38 is a diagram showing an example display for the search results obtained when, according to the first embodiment of the present invention, the attribute BR=attribute value Tokyo branch is applied for all the devices that are searched for;

FIG. 48 is a table showing the rank awarded for each user ID that is registered in the server terminal according to the third embodiment of the present invention;

FIG. 49 is a table showing the rank awarded for each user ID, the user of which is permitted to employ each device terminal that is registered, according to the second embodiment of the present invention, in the server terminal; and FIG. 50 is a table showing the hierarchial location information that can be searched for each user ID rank that, according to the second embodiment of the present invention, is registered in the server terminal.

DETAILED DESCRIPTION OF THE PREFERRED EMBODIMENTS (First Embodiment)

An explanation will now be given, while referring to the accompanying drawings, for a server terminal on a network, a client terminal, a device terminal, a device search system, a device search method, and a storage medium according to a first embodiment of the present invention.

Figure 1:
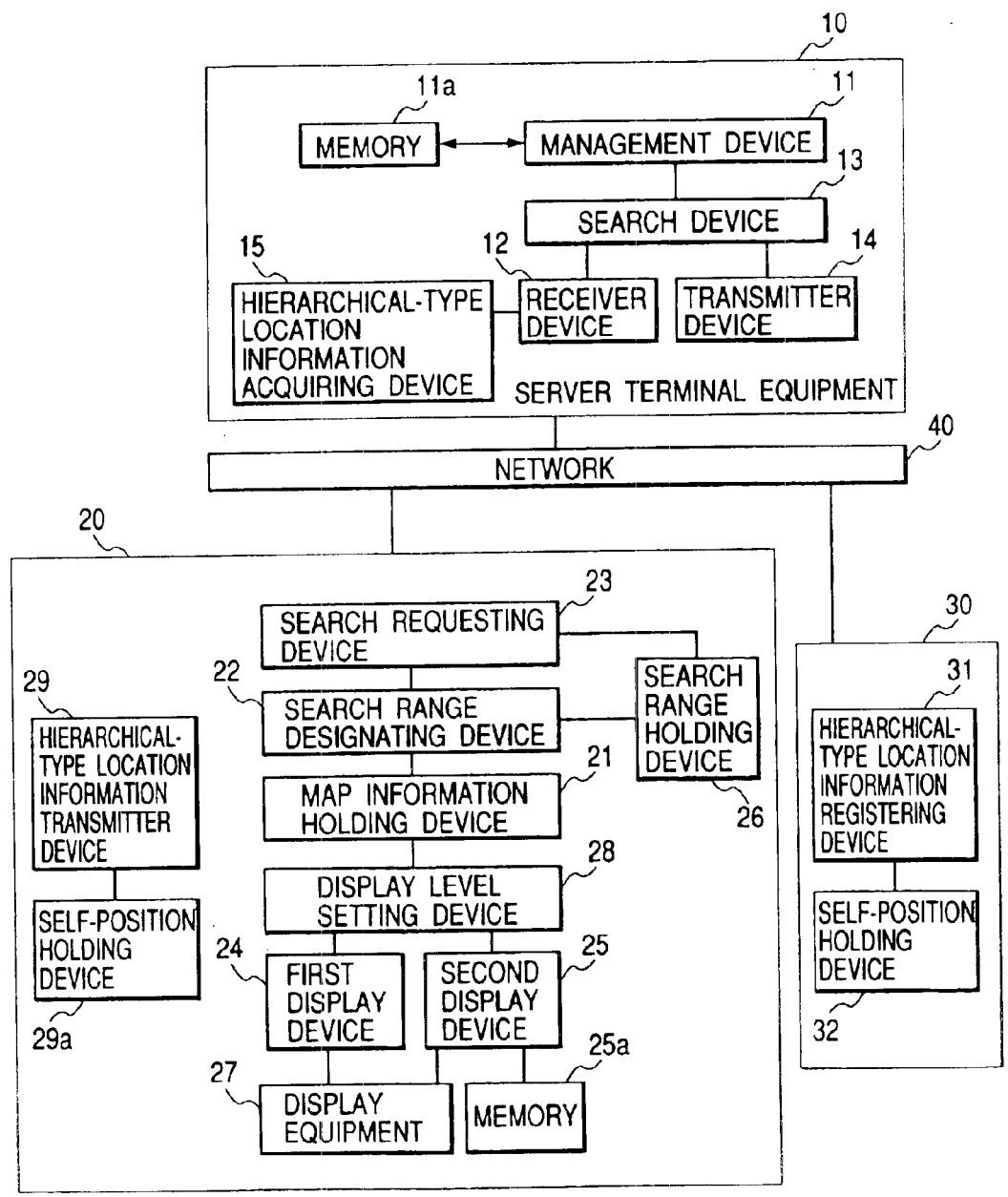
FIG. 1 is a diagram illustrating the features of a network system according to a first embodiment of the present invention.

FIG. 1 is a diagram illustrating the basic arrangement of a device search system according to the first embodiment of the present invention. As is shown in FIG. 1, a server terminal 10, which functions as a directory server, a client terminal 20 and a device terminal 30 are connected to a network 40, such as an ethernet or a USB. The device terminal 30 is an information processing apparatus, such as a printer, a facsimile machine or a scanner. Generally, multiple device terminals 30 are connected to a network 40.

In this embodiment, a workstation, which includes a management device 11, a receiving device 12, a search device 13 and transmitter device 14, is employed as the server terminal 10.

The management device 11 includes a memory 11a for storing hierarchial location information (which will be described later, in detail) that hierarchically represents information concerning the locations of the device terminals 30, and information concerning various attributes of the device terminals that correspond to the hierarchial location information. The management device 11 manages these data.

In the processing that is performed, the client terminal 20 issues search requests to the receiving device 12 and to a hierarchical-type location information acquisition device 15, which upon receiving the search request acquires hierarchical-type location information for the client terminal 20. While in response to the search request received by the receiving device 12, the search device 13, which employs the location information obtained for the client terminal 20 by the hierarchical-type location information acquisition device 15, conducts a search for the device terminals 30 that are managed by the management device 11. Subsequently, the transmitter device 14 transmits to the client terminal 20 the results of the search performed by the search device 13.

A personal computer is employed as the client terminal 20, and includes a map information holding device 21, a search range designating device 22, a search requesting device 23, a first display device 24, a second display device 25, a search range holding device 26, a display unit 27, a display level setting device 28, a hierarchial-type location information transmitter device 29, which transmits the hierarchical-type location information for the client terminal 20, and a self-position holding device 29a, which holds the hierarchical-type location information for the client terminal 20.

The map information holding device 21 holds various types of map information that correspond to the hierarchical-type location information, while the search range designating device 22 designates a range, such as the floor or the room of a specific building, for a device terminal 20 search performed in accordance with a user's desires.

The search requesting device 23 issues a request to the server terminal 10 to perform a search for the device terminals 30 within the range designated by the search range designating device 22.

The hierarchical-type location information transmitter device 29 issues a search request in accordance with the location information provided by the client terminal 20.

The display level setting device 28 sets a range for the disclosure of the results, received from the server terminal 10, of a search for the device terminals 30.

Based on the range that is set by the display level setting device 28 for the disclosure of the results, received from the server terminal 10, of the search performed for the device terminals 30, the first display device 24 displays, on the screen of the display unit 27, map information corresponding to the hierarchical-type location information. The second display device 25 also displays, on the map information display provided by the first display device 24, information (bit map data representing devices: icons) describing the device terminals 30 that were searched for. The second display device 25 includes a memory 25a for storing the relevant bit map data.

The search range holding device 26, which is basically constituted by a memory, holds the search range that was designated by the user, so that the range can be employed for the next search, without the designation of a new one being required.

The hierarchial-type location information for the client terminal 20 that is held in the self-position holding device 29a may be entered by the user at a keyboard (not shown), or may be transmitted by a manager from the server terminal 10 to the client terminal 20.

The device terminal 30 includes: a self-position holding device 32, for storing and retaining its own position as hierarchical-type location information; and a hierarchical-type location information registering device 31, for registering the information held by the self-position holding device 32 in the server terminal 10 in consonance with a predetermined timing. The hierarchical-type location information for the device terminal 30, which is stored in the self-position holding device 32, may be entered by the operating unit of the device terminal 30, or may be transmitted by a manager from the server terminal 10 or the client terminal 20. In this embodiment, for convenience sake, the individual components of the devices 10, 20 and 30 have been explained as independent components; however, it is apparent that these components may be integrally constituted by using a CPU, an MPU and a memory.

The individual functions of the thus arranged device search system used in this embodiment will now be described in detail.

Figure 2:
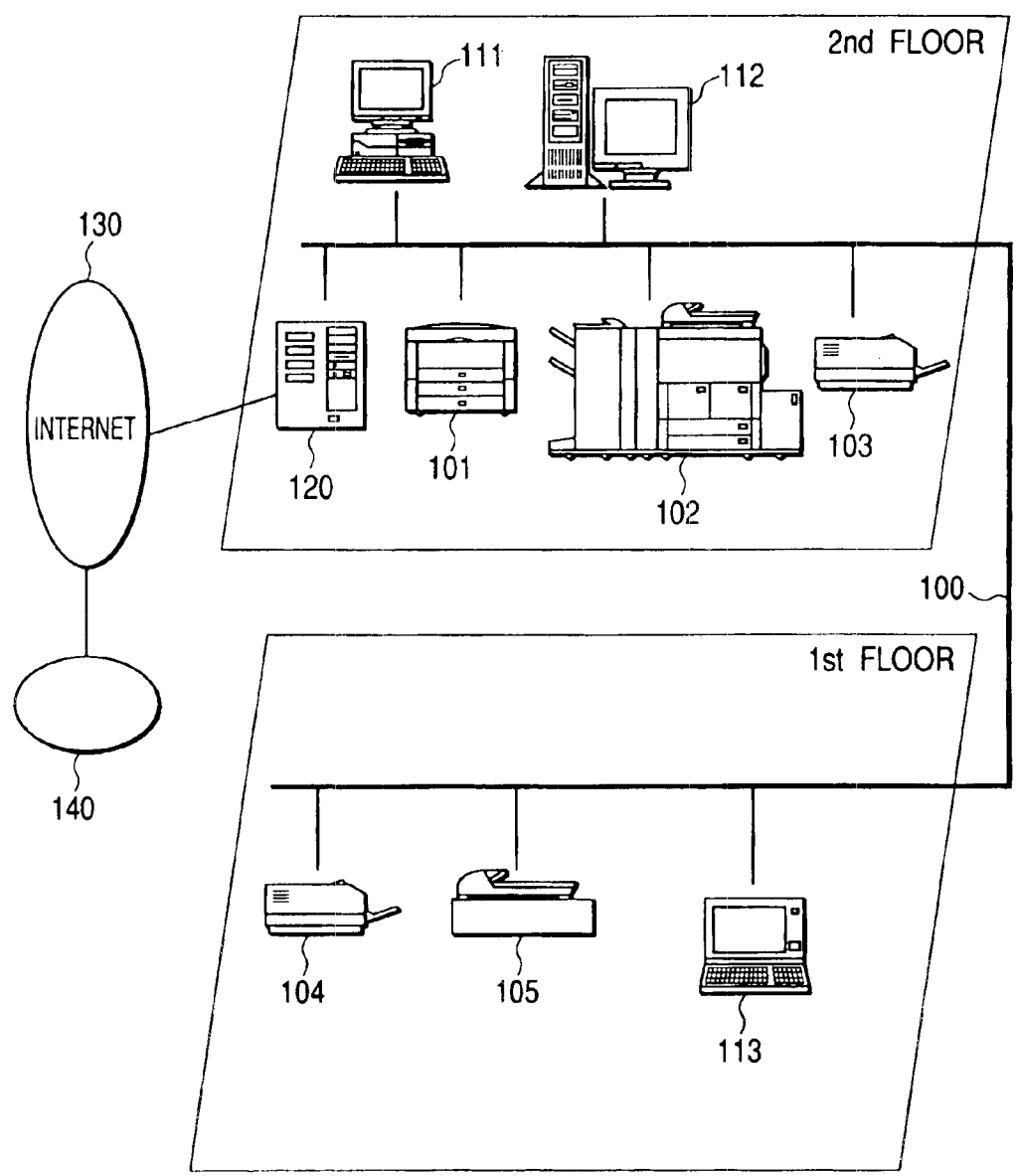
FIG. 2 is a diagram showing the configuration of a network wherein a device searching system of the first embodiment of the invention can be operated.

FIG. 2 is a diagram illustrating a specific arrangement for a network wherein the device search system of this embodiment can be used.

In FIG. 2, the network comprises: a color printer 101, an MFP (a Multi-Function Peripheral, which in this embodiment is used a copy machine but which can also be used as a network color printer, a scanner or a facsimile machine) 102; monotone printers 103 and 104; and a scanner 105 that is connected to the network.

Also connected to the network are a desktop computer (PC) 111 and a notebook computer (PC) 113, each of which functions as a client terminal, described above, and each of which can execute a client terminal program. As will be described later, these PCs include a function for issuing inquiry information, to a server terminal connected to the network, for a device terminal that satisfies a desired condition, as well as a function for displaying the search results.

For this embodiment, a workstation WS 112 is provided to execute the network server program. This workstation 112 is connected to the network the same was as is the above described server terminal, and provides storage for various types of information concerning the network devices 101 to 105, as will be described later. The workstation WS 112 receives an inquiry for a device search from either of the client terminals 111 and 113 connected to the network, and returns the results provided by a search to the requesting terminal, 111 or 113.

Of the device terminals, the color printer 101, the multi-function copy machine 102 and the monotone printer 103, as well as the client terminal 111, the server terminal 112 and a fire wall 120 are installed on the second floor, while the monotone printer 104 and the scanner 105 are installed on the first floor. As is also shown, the notebook PC 113 is currently connected to a LAN 100 on the first floor, although it may later be disconnected.

The LAN 100 is further connected to the Internet 130 via the firewall 120, and via the Internet 130, is also connected to another network 140.

Figure 3:
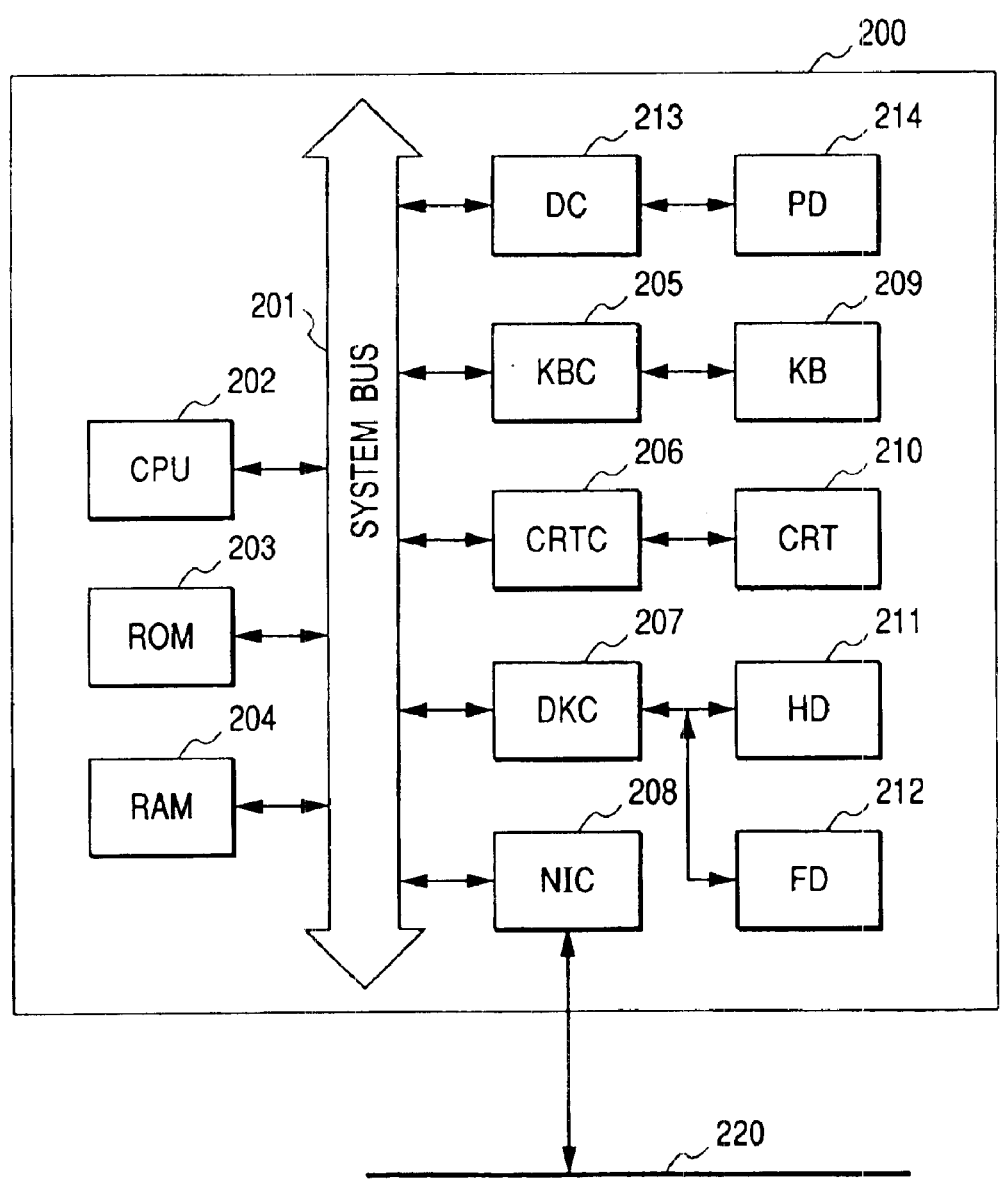
FIG. 3 is a diagram illustrating the internal arrangement of a personal computer according to the first embodiment of the present invention.

FIG. 3 is a schematic diagram illustrating the internal arrangement of a common personal computer. Basically, the desktop PC 111, the notebook PC 113 and the server terminal 112 in FIG. 2 all have the internal arrangement shown in FIG. 3.

In FIG. 3, a PC 200 executes client terminal software or network server terminal software (usually referred to, hereinafter, as network device terminal search software), and is the equivalent of one of the devices 111, 112 and 113 in FIG. 2.

The PC 200 includes a CPU 202, which executes the network device terminal search software that is stored, in a ROM 203 or on a hard disk (HD) 211, or that is supplied by a floppy disk controller (FD) 212. The PC 200 controls the device terminals that collectively are connected to a system bus 201.

A RAM 204 functions as a main memory and a work area for the CPU 202. A keyboard controller (KB) 205 controls the entry of instructions at a keyboard (KB) 209. And a CRT controller (CRTC) 206 controls the display screen of a CRT display (CRT) 210.

A disk controller (DKC) 207 controls the accessing of a hard disk (HD) 211, on which a boot program, various applications, an editing file, a user file and a network management program are stored, and the floppy disk controller (FD) 212.

A network interface card (NIC) 208 is used to exchange data, via a LAN 220, with network printers, other network devices, or PCs.

Further, in this embodiment a pointing device controller (PDC) 213 controls a pointing device (PD) 214 and the LAN 220 corresponds to the LAN 100 in FIG. 2.

The hierarchical-type location information will now be described.

Figure 4:
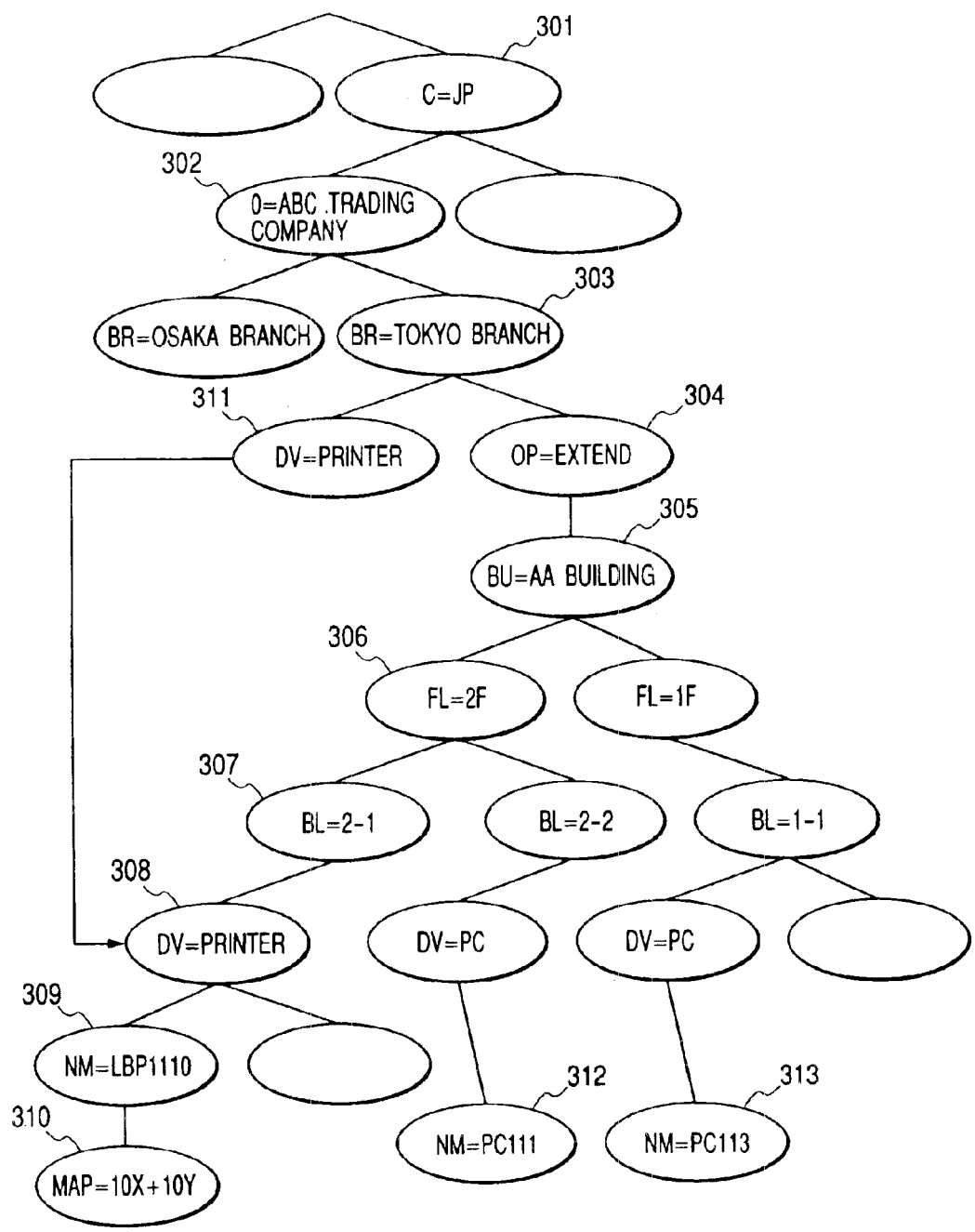
FIG. 4 is a diagram showing example hierarchial location information according to the first embodiment of the present invention.

As is shown in FIG. 4, the hierarchical-type location information is so constituted that the location information for a client terminal and a device terminal has a hierarchical structure, and so that a hierarchical class can be designated in accordance with the intent of a user. In FIG. 4, for an LBP 1110 (309), its hierarchical-type location information is designated as (C=JP(301), O=ABC Trading Company (302), BR=Tokyo branch (303), OP=extend(304), BU=The AA Building (305), FL=2F(306), BL=2-1(307), DV=printer (308)). In this case, the map is represented as "10X+10Y" (310)."

For each entry, "C" represents the name of a counter (JP denotes Japan, US denotes the United States, etc.), "O" represents the name of an organization (ABC Trading Company, XYZ Products, etc.), "BR" represents the name of a branch or a subdivision (Tokyo branch, Osaka branch, etc.), "OP" represents the presence of optional information (extended), "BU" represents the name of a building (AA Building, BB Building, etc.), "FL" denotes a floor number (1F, 2F, etc.), "BL" denotes a block on a floor (101, 201, etc.), "DV" denotes the attribute of a client terminal or a device terminal (a printer, MFP, PC, etc.), and "NM" denotes the name of a device terminal (LBP 1110, LBP 3310, etc.). The attribute of each entry has a value that falls within a predetermined range (value).

As is described above, according to the embodiment, the location information for each device terminal that is connected to the network is managed by using a hierarchical structure. Thus, the location of a device terminal that is requested for the performance of a search and that corresponds to a user's intent is appropriately specified, and the location of the pertinent device terminal can be displayed so that the user can easily identify it. The hierarchical structure, however, is not limited to that in FIG. 4, and various other structures can be employed.

Figure 5:
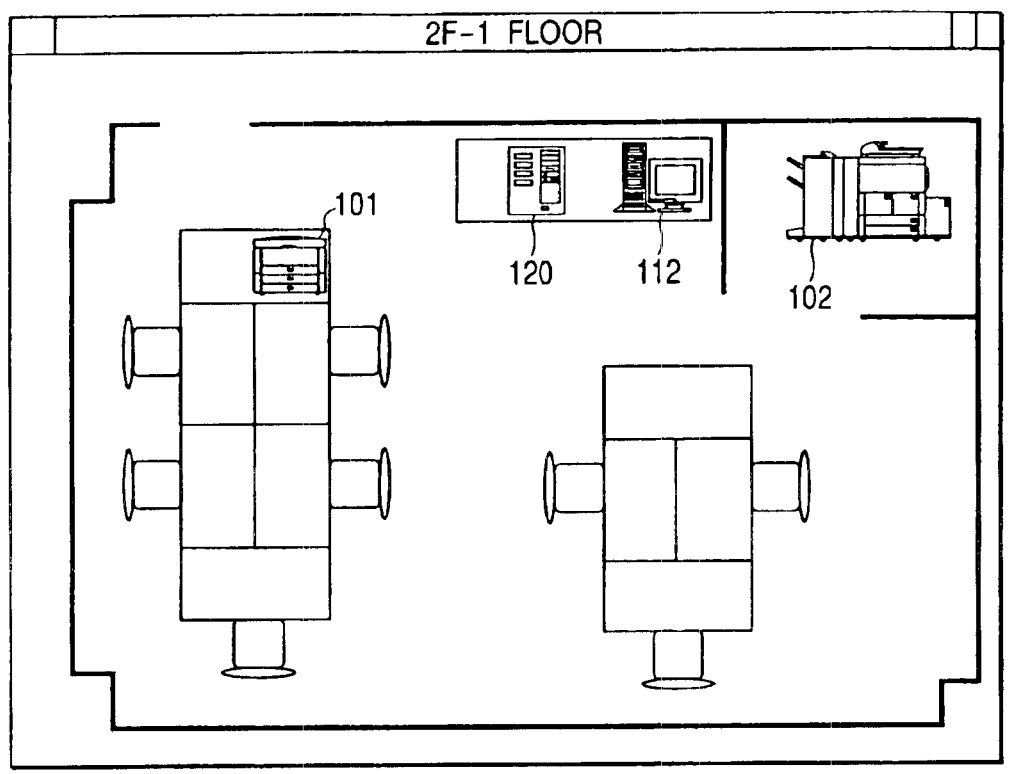
FIG. 5 is a diagram showing the location of each device terminal in block 2F2-1, according to the first embodiment of the present invention.

FIG. 5 is a diagram showing a location map for the block 2-1 on the 2F. The layout, such as the actual arrangement of desks and the partitions on that floor, is provided in advance as a bit map, and the color printer 101, the MFP 102, the firewall 120 and the server terminal 112 are represented at locations on the layout, as is shown in FIG. 5.

Figure 6:
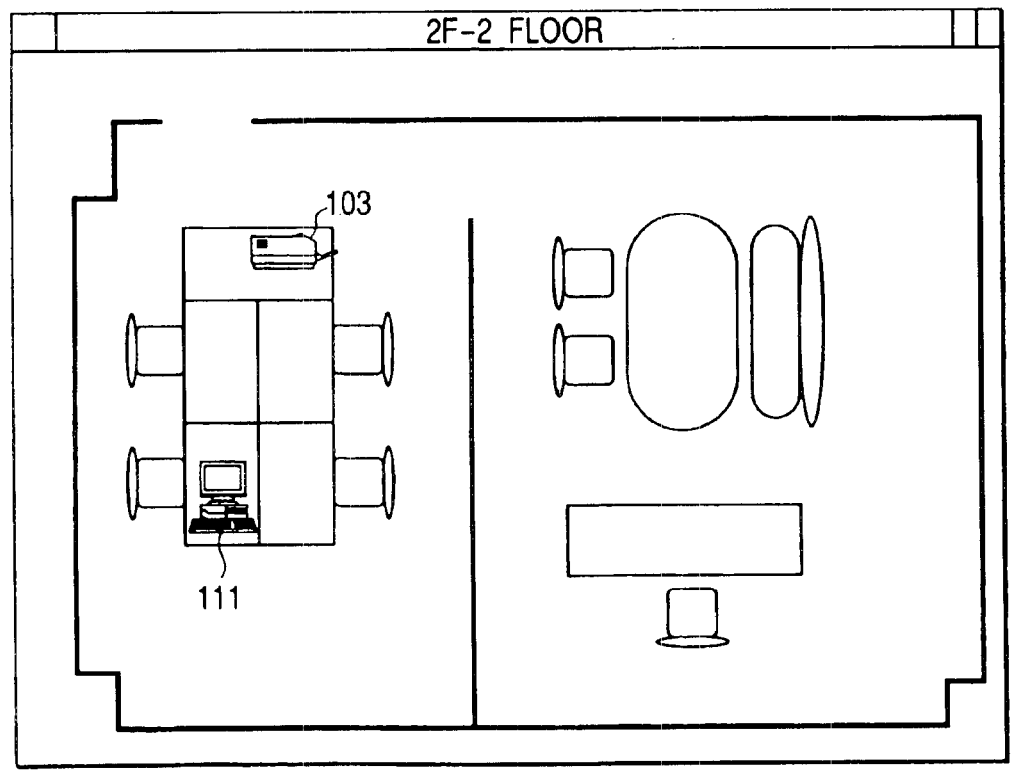
FIG. 6 is a diagram showing the location of each device terminal in block 2F2-2, according to the first embodiment of the present invention.

FIG. 6 is a diagram showing a bit map for the block 2-2 on floor 2F. In the block 2-2 on floor 2F, the PC 111 and the printer 103 are positioned as is shown in FIG. 6.

Figure 7:
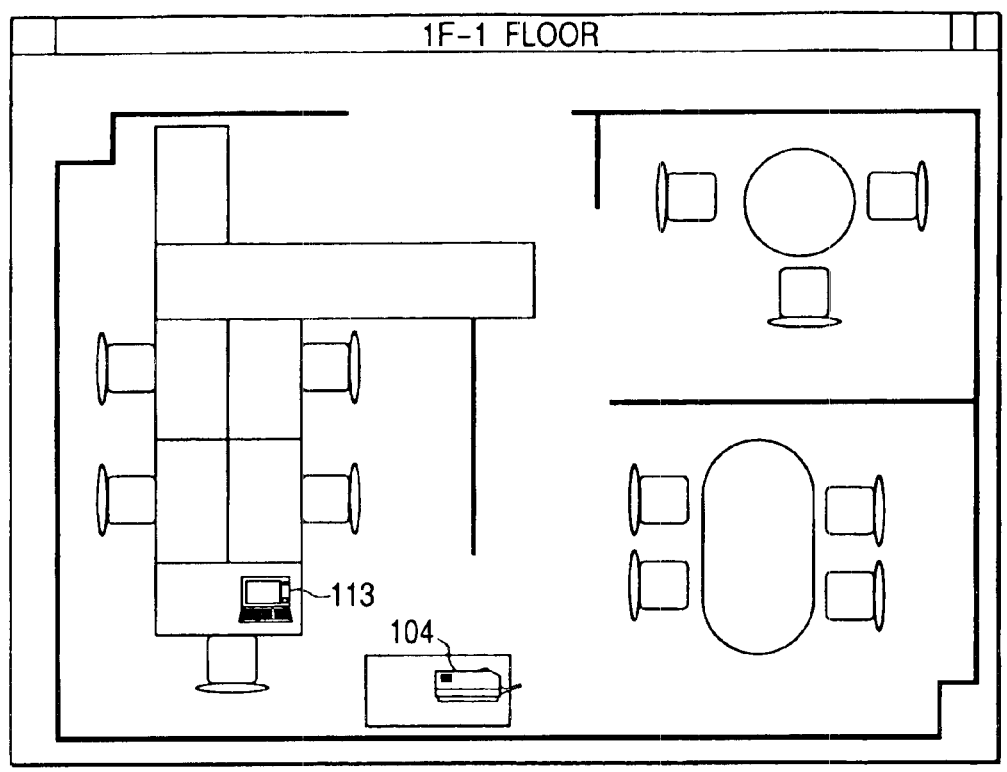
FIG. 7 is a diagram showing the location of each device terminal in block 1F1-1, according to the first embodiment of the present invention.

FIG. 7 is a diagram showing a bit map for the block 1-1 on floor 1F. In the block 1-1 on floor 1F, the PC 113 and in the layout the monotone printer 104 are located as is shown in FIG. 7.

Figure 8:
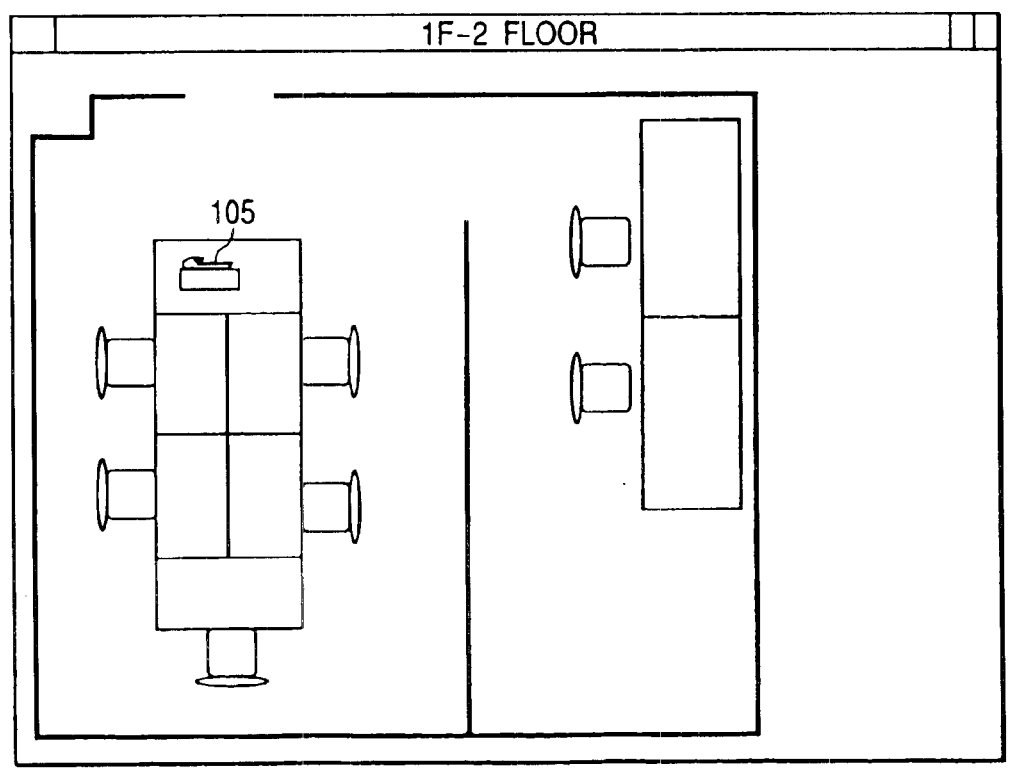
FIG. 8 is a diagram showing the location of each device terminal in block 1F1-2, according to the first embodiment of the present invention.

FIG. 8 is a diagram showing a bit map for the block 1-2 on floor 1F. In the block 1-2 on floor 1F, the scanner 105 is positioned as is shown in FIG. 8. As will be described later, this bit map is displayed on the screen of the client terminal of a user.

FIG. 9 is a diagram showing the hierarchical-type location information and the attribute information for each device terminal that is managed by the server terminal 112. As is shown in FIG. 9, in this embodiment a total of five device terminals are managed, and for each device terminal, management is provided for each of the hierarchical-type location information items 802 to 810. Further, in this embodiment, a color attribute 811, which represents the pertinent device terminal, can input and output color data, an IP address 812, which is the network address of the terminal device, and a charge attribute 813, which represents charge information, are managed as attribute information of the device terminal. The users of the client terminals are sorted into regular users and guest users, and information 814 indicates whether a guest user can employ a corresponding device. It should be noted that a regular user can employ all the devices.

In FIG. 9, the LBP 1110, an MFP 6550, an LBP 3310 and an SCN 2160 correspond respectively to the color printer 101, the MFP 102, the monotone printers 103 and 104, and the scanner 105 in FIG. 2. In addition, each column in FIG. 9 corresponds to a tuple, which is data for one case concerning the registered device, and each row corresponds to an attribute for each tuple.

FIG. 10 is a diagram showing the hierarchical-type location information and device terminal attribute information that is registered as is shown in FIG. 9. The location information 902 to 911 and the attribute information 913, 914 and 915 are transmitted to the server, after the tab (TAG). In this embodiment, as the device terminals are powered on they, not the server terminal 112, register this information.

The server terminal 112 manages the received information by using the table 800 in FIG. 9, and upon the receipt of a request from a client terminal, transmits a response to the client terminal. A hierarchical-type location information TAG 901 is used to indicate that the information 902 to 911 that follows is hierarchical-type location information.

A device terminal attribute information TAG 912 indicates that the following information 913 to 916 represents the attribute of the device terminal. That is, the information 913 indicates the Color attribute is OK, i.e., that color printing is available; the information 914 indicates that the IP address is 192.1.2.1; the information 915 indicates that printing per sheet charges are five yen; and the information 916 indicates that guest user employment is not permitted.

FIG. 11 is a diagram showing the hierarchical-type location information and the client attribute information for the client terminal. Location information 702 to 711 and client attribute information 713 are transmitted to a server after the transmission of individual tags (TAGs). In this embodiment, the information is transmitted to the server 112 when the device terminal search request is issued. In this case, information 713 represents the attribute of a user of the client terminal, and "guest" represents a guest user. When the user is a regular user, data to that effect is stored.

In this embodiment, information as to whether the user of a client terminal is a regular user or a guest user is stored in advance in the client terminal. Therefore, for a guest user, the user must release to the guest user the client terminal that is set up.

Figure 12:
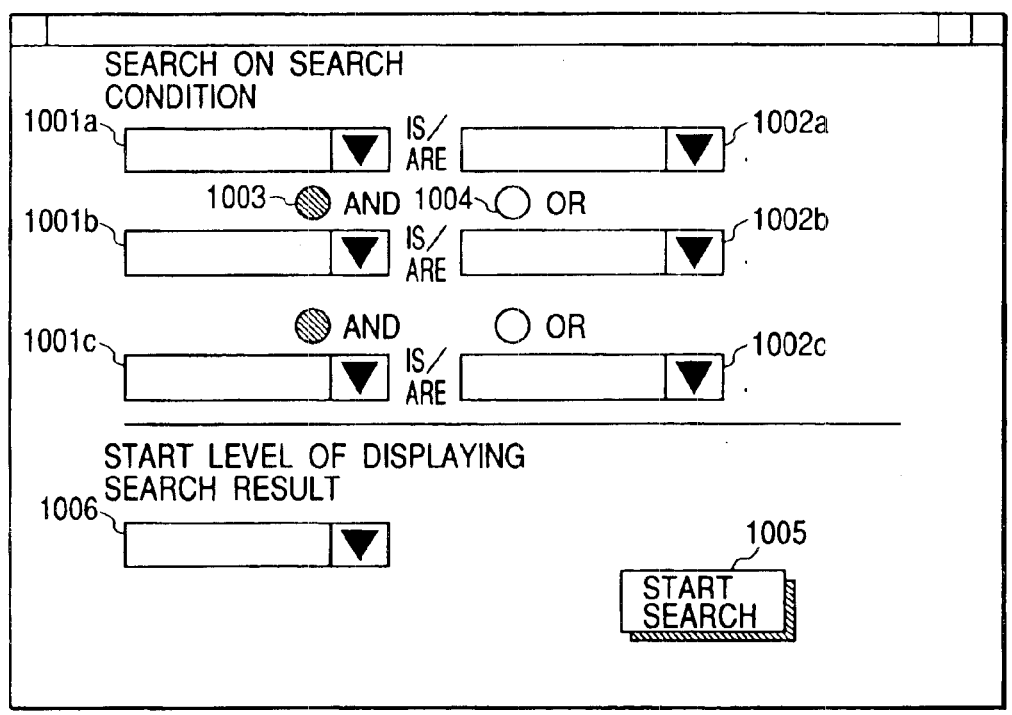
FIG. 12 is a diagram showing a device terminal search input screen according to the first embodiment of the present invention.

FIG. 12 is a diagram showing a search condition input screen when a search is conducted by the client terminals 111 to 113. In FIG. 12, search data are input by the entries 1001*a*, 1001*b* and 1001*c*. On this input screen, a pull-down menu can be provided to select the search data. Attribute information corresponding to each entry is input as part of the entries 1002*a*, 1002*b* and 1002*c*. The start level whereat the search results obtained under the search conditions are to be displayed is entered in an entry 1006.

For example, when a search is to be performed for a selected device terminal, the attribute information for a printer, an MFP or a scanner is displayed on a pull-down menu, and the desired attribute information is selected by a user.

The search state is entered by using input buttons 1003 and 1004, with an AND condition being employed for the button 1003 and an OR condition being employed for the button 1004. When the client has entered the search state, the user enters a display start level in the entry 1006, in order to set the start level whereat results that are to be obtained under the search condition are displayed, and depresses a search start button 1005 to initiate the execution of the search.

Figures 13, 14:
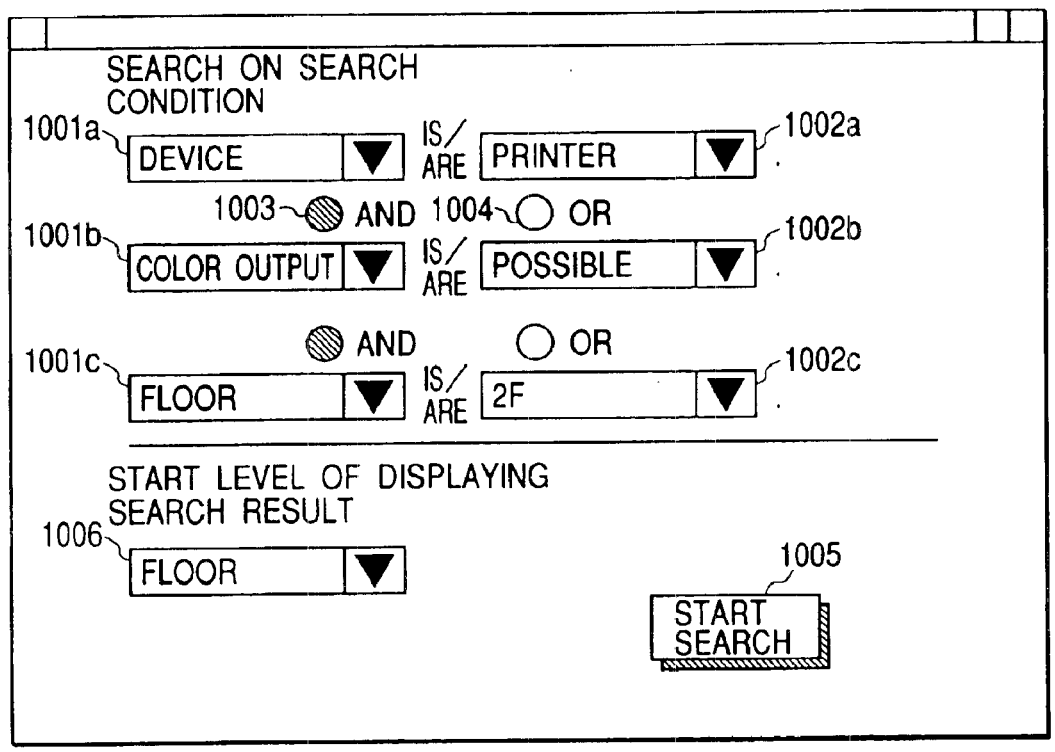
FIG. 13 is a diagram showing a search input screen for a device terminal according to the first embodiment of the present invention.
FIG. 14 is a diagram showing the conditions for a search for the device terminal according to the first embodiment of the present invention.

FIG. 13 is a diagram showing an example search entry. In this example, a device terminal, which is a printer for which attribute information is provided and which can enable color output, is searched for. To conduct a search for "a printer installed on the second floor," which is targeted using the hierarchical-type location information, "floor" is input as part of the entry 1001c, and "2F" is input as part of the entry 1002c. To designate the start level whereat the search results are displayed, "floor" is input as part of the entry 1006.

FIG. 14 is a diagram showing expressions that represent the search condition for the above example, wherein the device terminal (DV) is a printer installed on the second (2F) floor (FL) for which (OK) color output (color) can be enabled.

FIG. 15 is a diagram showing an example wherein the client terminal 111 requests the server terminal 112 to search for a device terminal under the search condition shown in FIG. 14, and the server terminal 112 returns, to the client terminal PC 111, information concerning the device terminal that matches the search condition. The server terminal 112 searches the information table 800 (FIG. 9) that is held in the server terminal 112 under the search conditions listed in FIG. 14, which are received from the client terminal 111, and returns, to the client terminal 111, information concerning the device terminal that matches the search conditions provided with the hierarchical-type location information.

In this embodiment, since only the device terminal that matches the search conditions in FIG. 14 is LBP 1110, the information shown in FIG. 15 is returned to the client terminal 111. Furthermore; since the device terminal LBP 1110 is located on the same floor as the client terminal 111, the server terminal 112 returns to the client terminal 111 the hierarchical-type location information entered below the block (BL) of the device terminal LBP 1110.

FIG. 16 is a diagram showing an example wherein the server terminal 112 returns, to the client terminal PC 113, information for the device terminal that matches the search conditions shown in FIG. 14. In this case, since the device terminal LBP 1110 that matches the search condition is located in the same building as the client terminal 113, the server terminal 112 returns, to the client terminal PC 113, the hierarchical-type location information entered below the floor (FL) of the device terminal LBP 1110.

FIG. 17 is a diagram showing information for a layout map held by the client terminals 111 and 113. The client terminals 111 and 113 can display the layout map for a device terminal 1401 that has hierarchical-type location information. I addition, layout map information 1403 is included for each block (BL) 1402.

Figure 18:
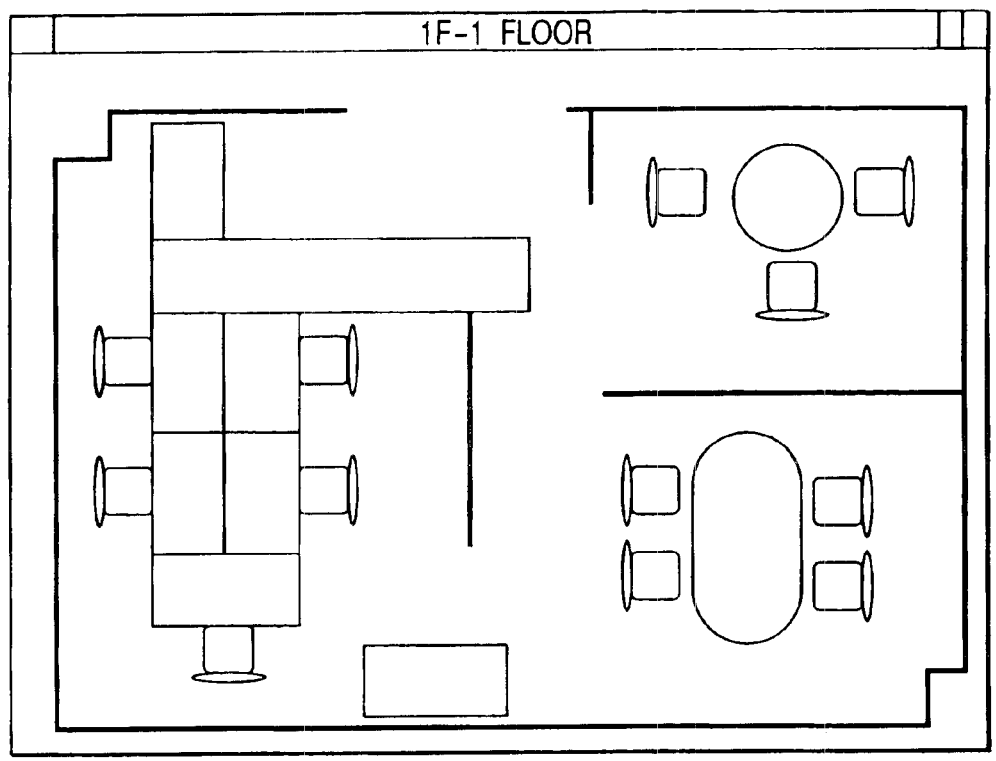
FIG. 18 is a diagram showing a layout bit map that is managed by the client terminal according to the first embodiment of the present invention.
Figure 19:
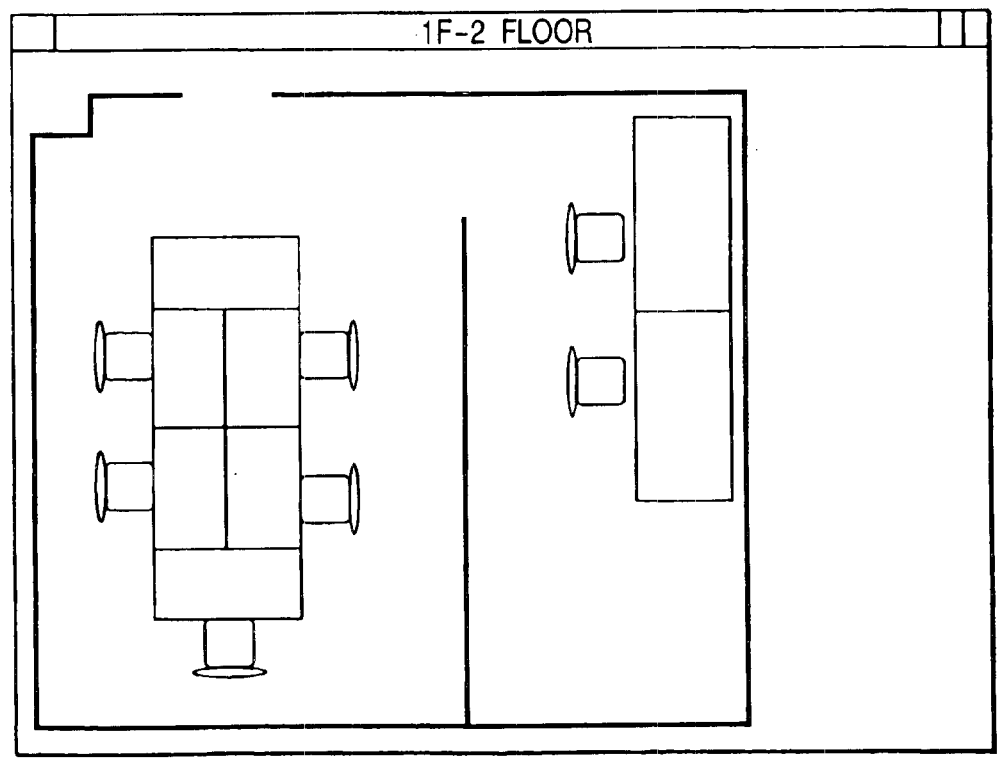
FIG. 19 is a diagram showing a layout bit map that is managed by the client terminal according to the first embodiment of the present invention.
Figure 20:
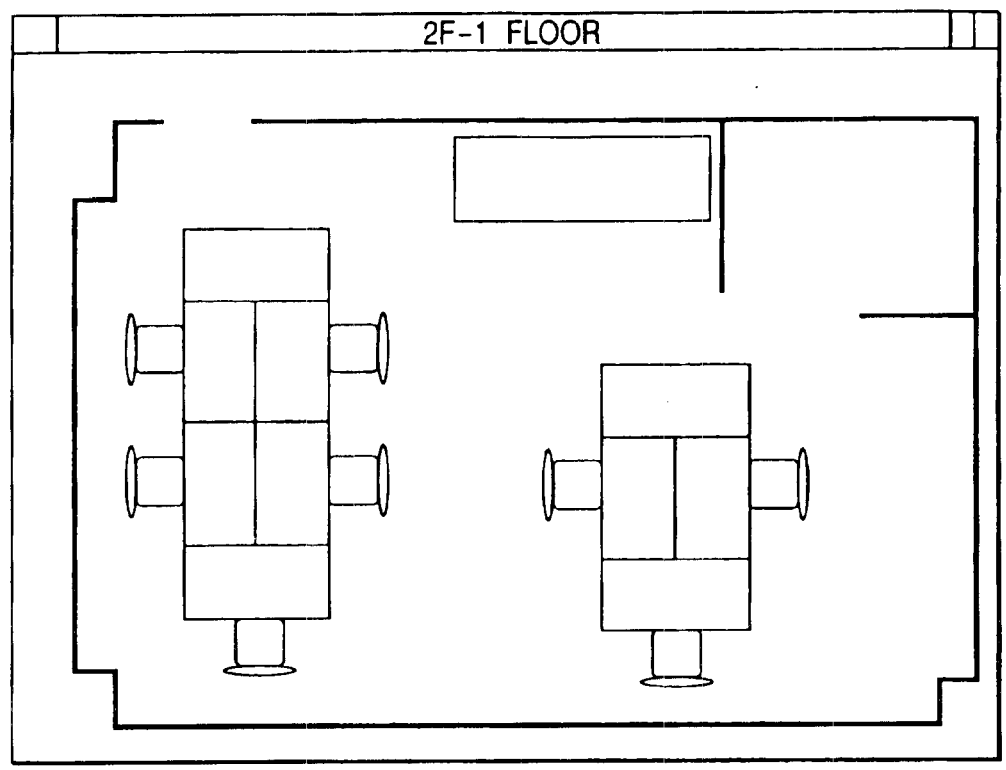
FIG. 20 is a diagram showing a layout bit map that is managed by the client terminal according to the first embodiment of the present invention.
Figure 21:
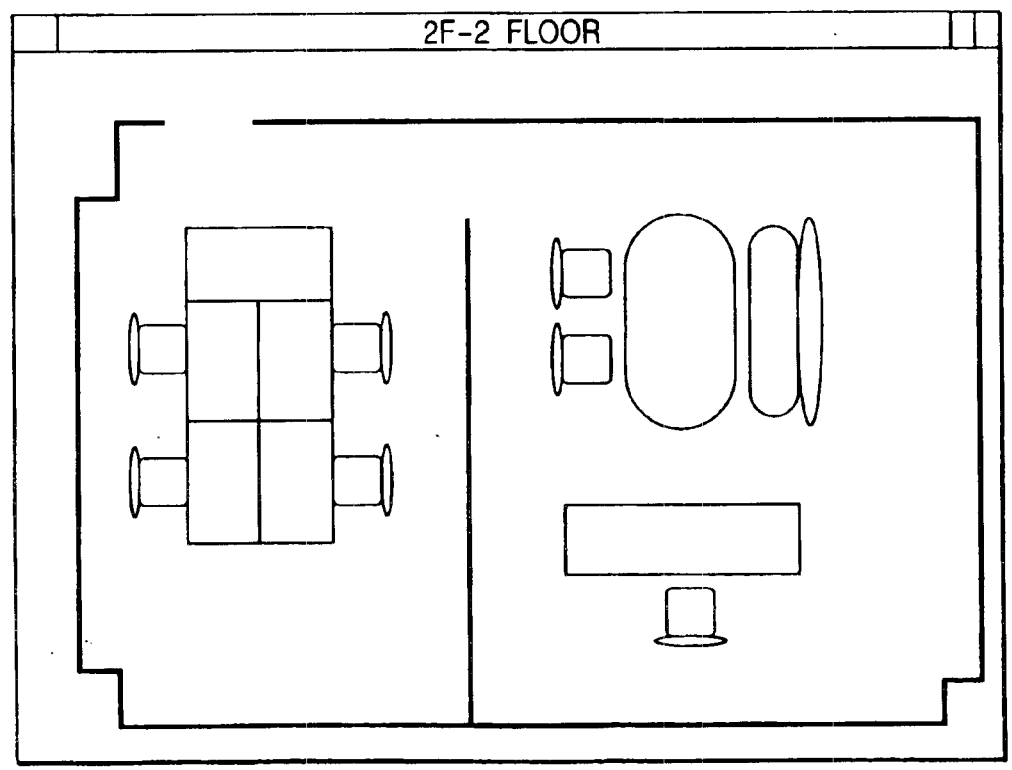
FIG. 21 is a diagram showing a layout bit map that is managed by the client terminal according to the first embodiment of the present invention.
Figure 22:
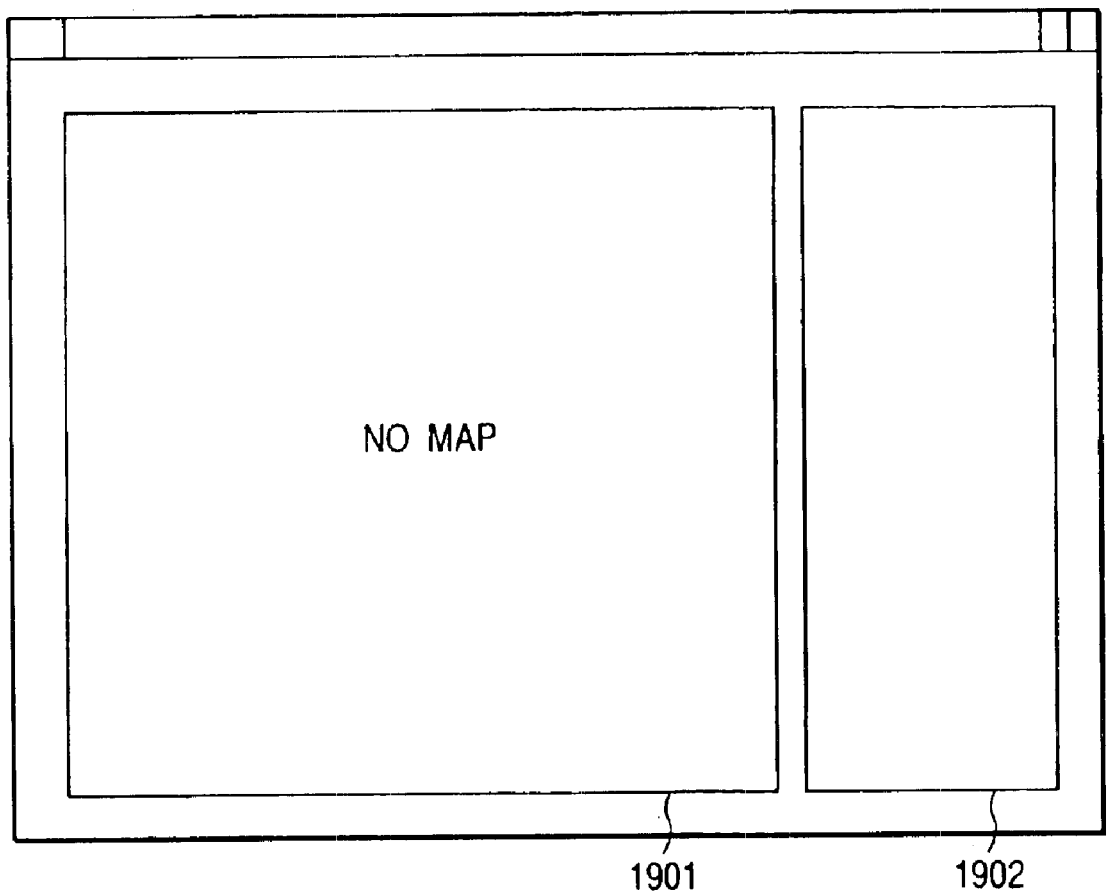
FIG. 22 is a diagram showing a layout bit map that is managed by the client terminal according to the first embodiment of the present invention.

In this embodiment, a layout bit map shown in FIG. 18 is held for BL 1-1, a layout bit map shown in FIG. 19 is held for BL 1-2, a layout bit map shown in FIG. 20 is held for BL 2-1, a layout bit map shown in FIG. 21 is held for BL 2-2, and a layout bit map shown in FIG. 22 is displayed when there is no attribute value.

FIGS. 18 to 21 are the layout bit map diagrams for the individual blocks. In this embodiment, information representing the device terminal that is searched for is superimposed on a layout bit map, so that the floor, the block and the position in the block at which the device terminal, for which a search is requested, is located can be clearly indicated.

FIG. 22 is a diagram showing an unknownMAP that is displayed when the device terminal does not hold the hierarchical-type location information, or when the layout bit map of the client terminal is not matched. In FIG. 22, the absence of map information is shown in an area 1901, and a device terminal that does not hold the hierarchical-type location information or that includes unmatched hierarchical-type location information is displayed in an area 1902.

FIG. 23 is a diagram showing bit map information for each device terminal held by the client terminal 111 or 113. The bit map information is correlated for each device terminal name (NM), and for an unknown device terminal name, a bit map labeled "unknown" is displayed.

Figure 24:
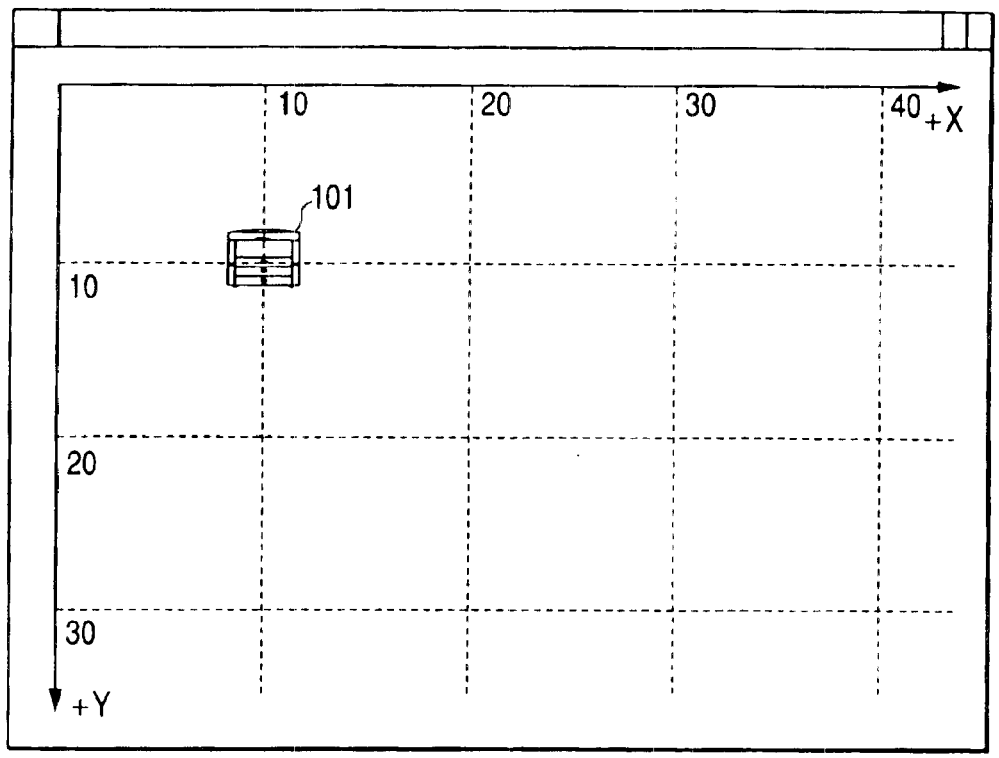
FIG. 24 is a diagram showing the location of a device terminal bit map that is managed by the device terminal according to the first embodiment of the present invention.

FIG. 24 is a diagram showing the location of a device terminal bit map that has been superimposed on a layout map. The color printer 101 (LBP 1110), for which the hierarchical-type map location information "10X+10Y" applies, is displayed at the position shown in FIG. 24. When the display bit map and the layout bit map are displayed together, the location of a device terminal for which a search has been requested can be shown so that it can be easily identified by a user.

Figure 25:
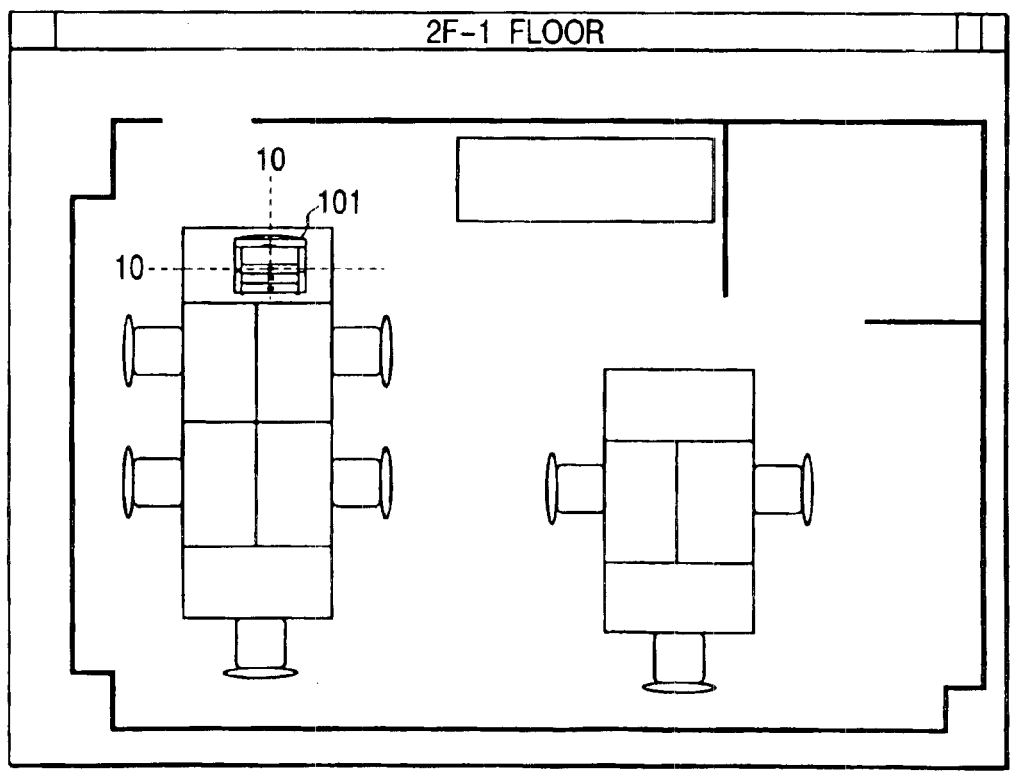
FIG. 25 is a diagram showing the device terminal search results obtained according to the first embodiment of the present invention.

FIG. 25 is a diagram showing an example bit map that is displayed by the client terminals 111 and 113 following a search. Based on the search results that are returned by the server terminal 112, and the start level for the display of the search results that is designated in the entry 1006 in FIG. 13, the block (2F-1) map is displayed, and on the map the device terminal LBP 1110 is displayed. From this display, it is apparent that the color printer 101 is located on the table near the door in the block 2-1 on the second floor.

Figure 26:
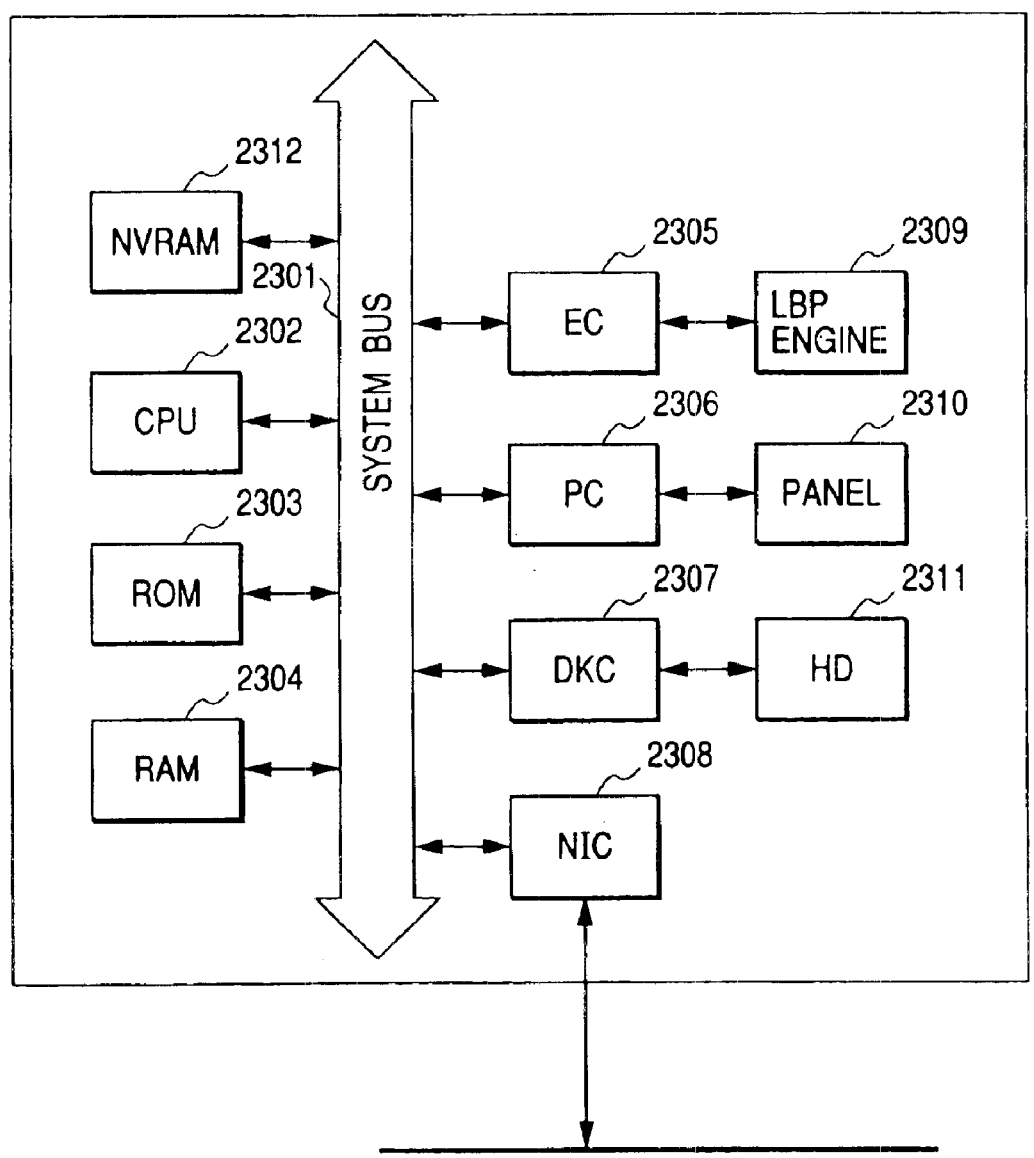
FIG. 26 is a diagram illustrating the internal arrangement of the device terminal according to the first embodiment of the present invention.

FIG. 26 is a block diagram illustrating the internal arrangement of the color printer 101 (LBP 1110) in this embodiment. As is shown in FIG. 26, the color printer 101 is so designed that a CPU 2302 for processing a program, a ROM 2303 in which the program is stored, and a RAM 2304 that serves as a work area and a buffer area for the program are connected to a system bus 2301.

An engine 2309 is also connected, via an LBP engine controller 2305, to the system bus 2301, and a panel controller 2306 controls the input/output to a panel 2310 and manages the panel 2310.

In this embodiment the color printer 101 (LBP 1110) a hard disk (HD) 2311, on which print data can be temporarily spooled. A disk controller 2307 manages the HD 2311. And a network interface controller 2308 is used to connect the printer 101 to a network.

Nonvolatile RAM (NVRAM) 2312 is used to hold data even when the power supply to the printer 101 is cut off, and in this embodiment, both the hierarchical-type location information and the attribute information are stored in the NVRAM 2312. This information may also be stored on the HD 2311, instead of in the NVRAM 2312.

FIGS. 27 to 31 are flowcharts used for explaining the processing performed for this embodiment, and will now be referred to while a detailed description of the processing is presented. The processing described below for the individual apparatuses is performed when the CPUs in these apparatuses execute programs that are stored using such memory devices as ROMs and hard disks.

Figure 31:
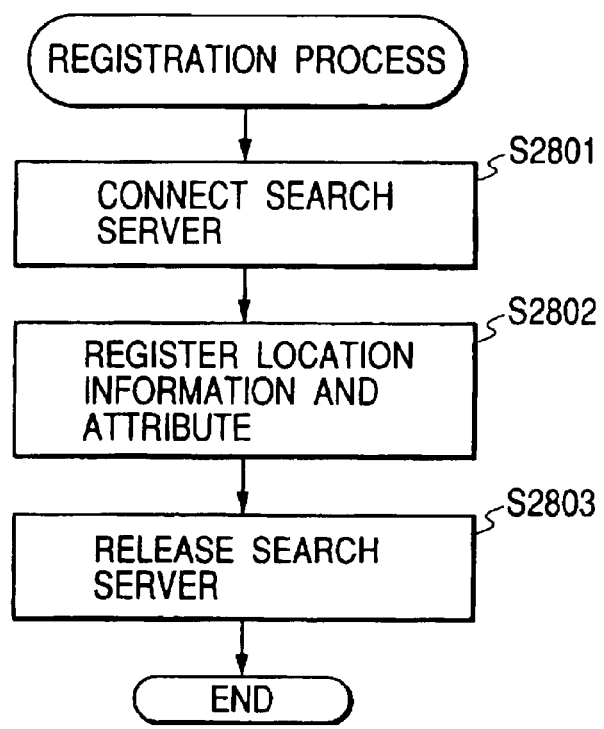
FIG. 31 is a flowchart showing the registration processing according to the first embodiment of the present invention.

First, the processing performed to register the hierarchical-type location information for a device terminal will be described while referring to the flowchart in FIG. 31. For this processing, the color printer 101 (LBP 1110) is employed as an example.

The LBP 1110 stores hierarchical-type location information and attribute information in the nonvolatile RAM 2312, which is the self-position holding device in the device terminal. When the LBP 1110 is powered on, the CPU 2302 is connected to the server terminal 112 (step S2801), and after the connection is established, the LBP 1110 reads the hierarchical-type location information and the attribute information from the nonvolatile RAM 2312 and transmits it to the server terminal 112. The server terminal 112 uses the form shown in FIG. 10 to register the hierarchical-type location information and the attribute information, for the LBP 1110, in the management device 11 (step S2802).

Following the completion of the registration, the CPU 2302 of the LBP 1110 is disconnected from the server terminal 112 (step S2803). By performing this processing, after the server terminal 112 is powered on, the individual device terminals can register their hierarchical-type location information and attribute information.

Figure 27:
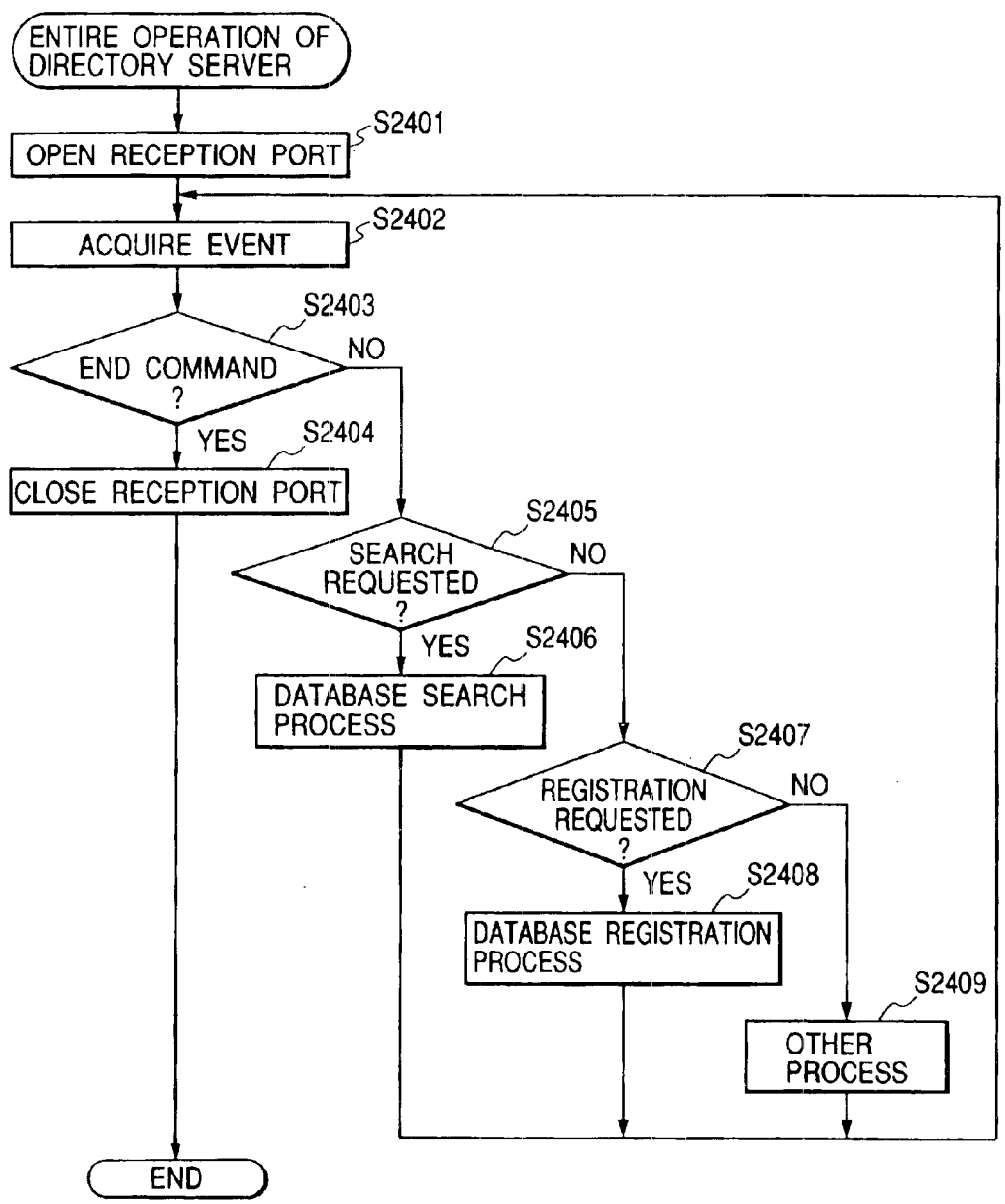
FIG. 27 is a flowchart showing the general processing performed by the server terminal according to the first embodiment of the present invention.

Now, the processing performed by the server terminal 112 will be described while referring to the flowchart in FIG. 27. The server terminal 112 is constituted by an event-driving program, and when an event occurs, the server terminal 112 analyzes it and performs a corresponding process.

When the server terminal 112 is powered on, first, the server terminal 112 opens a reception port (step S2401). The server terminal 112 then acquires an event (step S2402), and determines whether the acquired event is an end command (step S2403). When the acquired event is an end command, the server terminal 112 closes the reception port (step S2404), and terminates the processing.

But when at step S2403 the acquired event is not an end command, the server terminal 112 determines whether the acquired event is a search request (step S2405). When the event is a search request, at step S2406 the server terminal 112 performs a database search, which will be described later.

If at step S2405 the event is not a search request, at step S2407 the server terminal 112 determines whether the event is a registration request for submission to the database. If the event is a registration request, the server terminal 112 registers the received data in the table 800 in FIG. 9 (step S2408), following which the registered data are stored on the HD 211. When at step S2407 the event is another request, the server terminal 112 performs the other process (step S2409).

Figure 28:
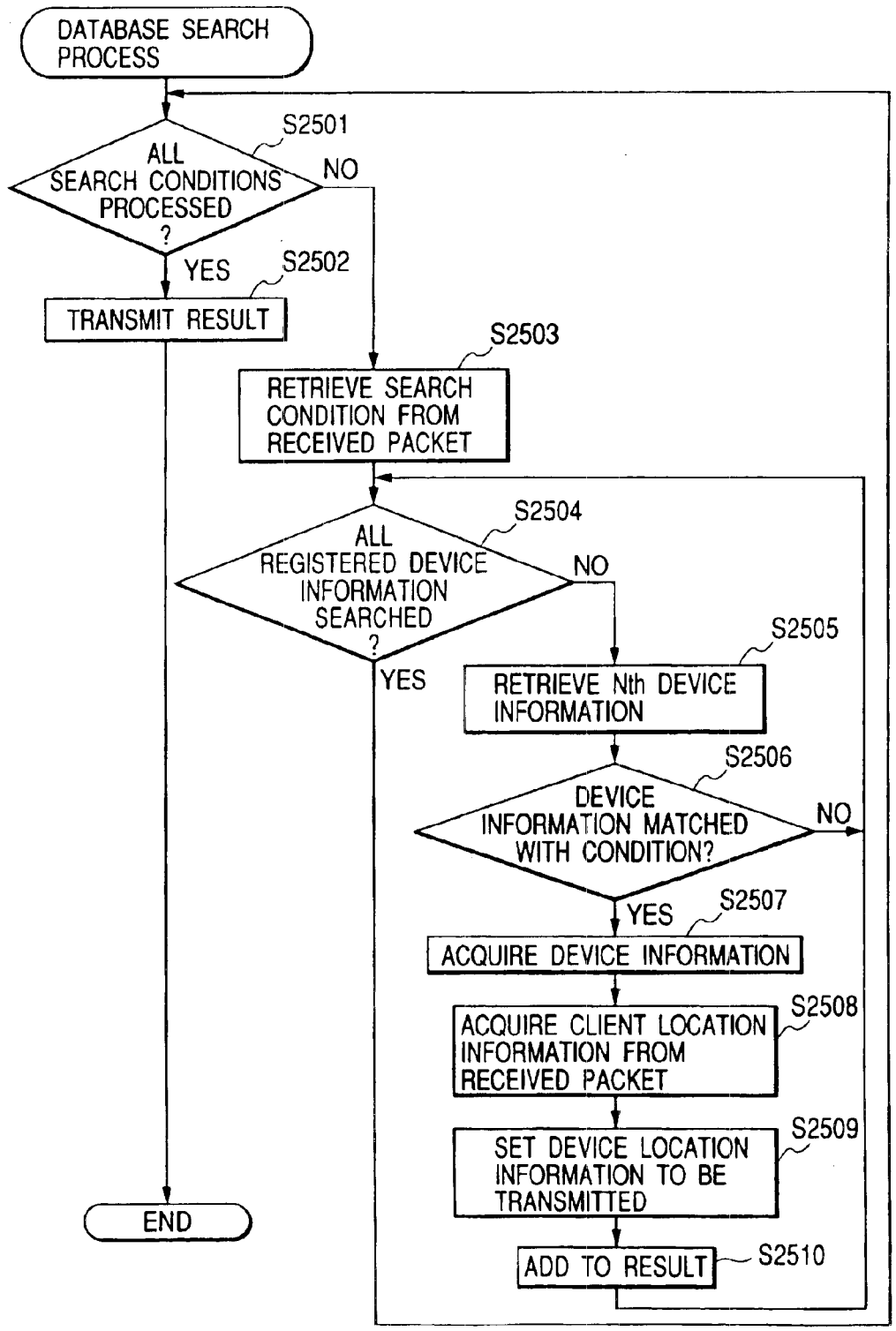
FIG. 28 is a flowchart showing the database search processing performed according to the first embodiment of the present invention.

The data search processing performed by the server terminal 112 will now be described in more detail while referring to FIG. 28.

In the search processing, at step S2501 a check is performed to determine whether the processing for all the search conditions has been performed. This processing is repeated until all the search conditions have been satisfied.

When, at step S2501, all the search conditions in a packet have been satisfied, the results are transmitted to the client terminal that requested the search (step S2502).

When all the search conditions have not yet been satisfied, program control advances to step S2503, whereat the search conditions (FIG. 14) are extracted from a received packet. Then, to satisfy the search conditions, a check is performed to determine whether a search has been conducted for all the registered device terminal information in the table in FIG. 9 (step S2504). To perform such a search, the location information for the client terminal that requested the search is obtained from the received packet, and based on this location information, and in consonance with the included search conditions, a search performed within an optimal range is conducted. For example, when the search conditions in FIGS. 13 and 14 are transmitted to the server terminal 112 by the client terminal 111 in FIG. 2, a search of the second floor of the AA Building of the Tokyo Branch of the ABC Trading Company is performed because the client terminal 111 is located in the AA Building.

Then, when at step S2504 it is determined that a search for all the registered device terminal information is to be performed, program control returns to step S2501 to extract the next search condition.

Thereafter, when at step S2504 a search of all the registered device terminal information has not been performed, program control advances to step S2505, and the n-th device information is extracted from the HD 211. Then, a check is performed to determine whether the extracted device terminal information matches the search condition (step S2506).

When the device terminal information matches a condition, that information is obtained (step S2507) and at step S2508 the location information for the client terminal that requested the search is obtained from the received packet. Then, the location information is extracted for a device terminal having a rank that is lower than that which matches the location information for the client terminal and the location information for the device terminal that is found (step S2509), and is added to the search results (step S2510). When the user of the client terminal is a guest user, only a device in the attribute table 800 in FIG. 9 that the guest user can employ is added.

When, at step S2506, the device terminal information does not match the search condition, program control returns to step S2504 to perform the processing for the next device. In this manner, a search of all the device terminals in the table 800 in FIG. 9 is performed in accordance with individual search conditions, and the search results are transmitted to the client terminal.

The overall processing performed by the client terminal 111 or 113 will now be described while referring to FIGS. 29 and 30.

The client terminal 111 or 113 is constituted by an event-driving program. When an event has occurred, the client terminal 111 or 113 analyzes the event and performs a corresponding process.

Figure 29:
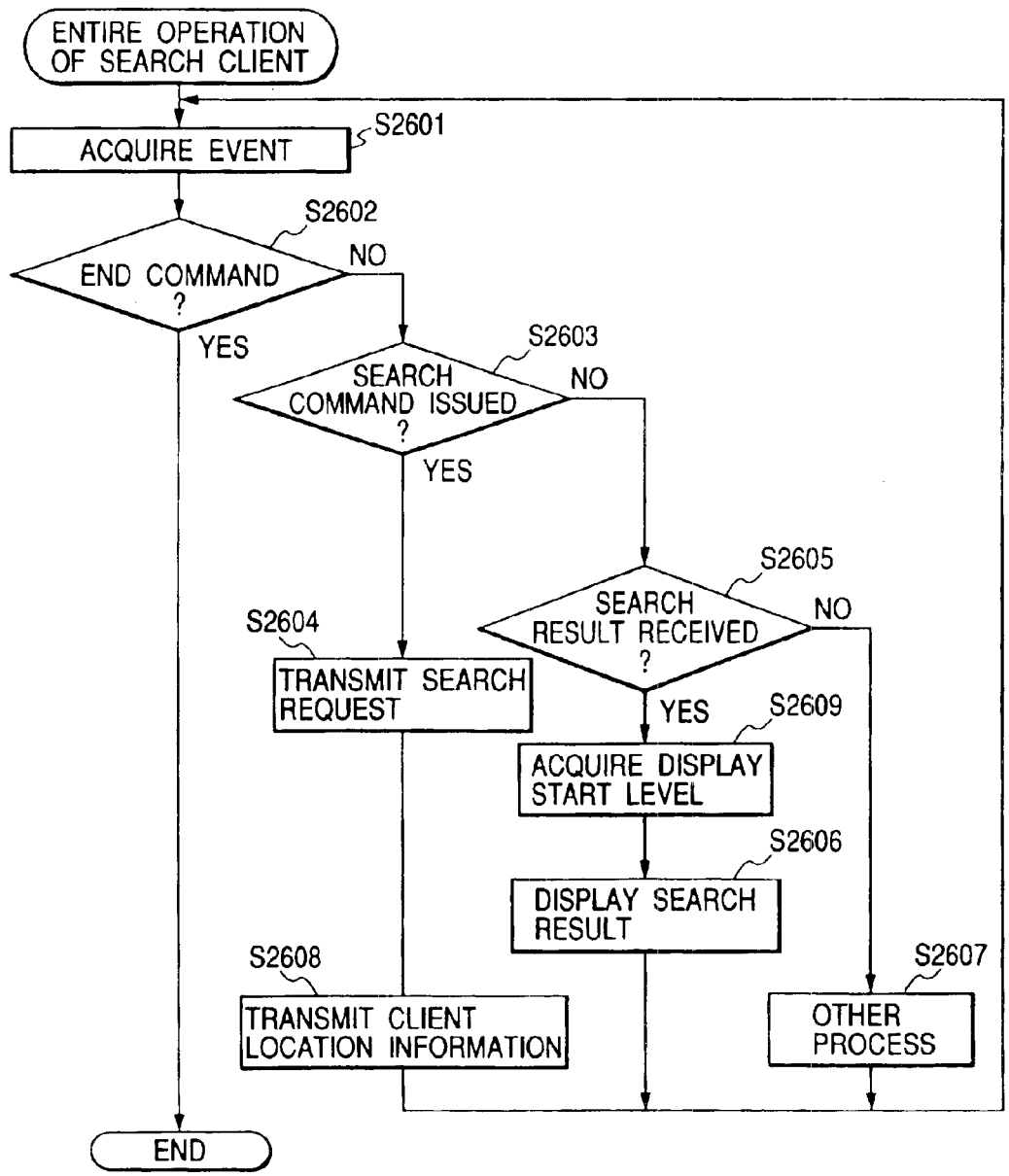
FIG. 29 is a flowchart showing the general processing performed by the client terminal according to the first embodiment of the present invention.
Figure 30:
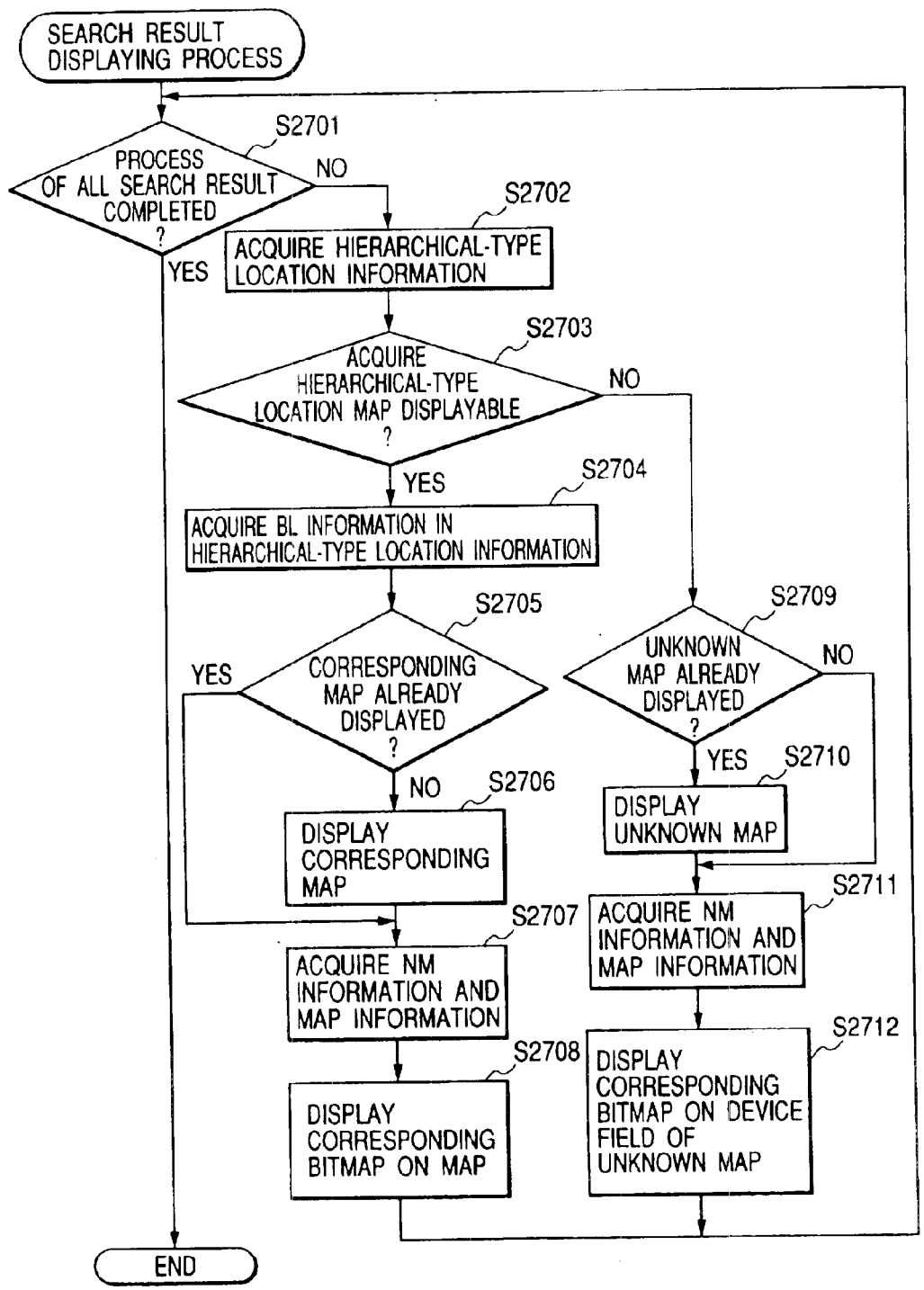
FIG. 30 is a flowchart showing the search result display processing according to the first embodiment of the present invention.

As is shown in the flowchart in FIG. 29, at step S2601 the client terminal 111 or 113 acquires an event. And when an end command event is acquired, the processing is terminated (step S2602).

At the client terminal 111 or 113, a user enters a search condition on the search condition input screen shown in FIG. 12. Then, when the user clicks on the search start button 1005, a search command request is issued.

When at step S2603 the acquired command is a request for the issue of a search command, in addition to the search request, the client terminal 111 or 113 transmits, to the server terminal 112, hierarchial-type location information for the client terminal 111 or 113 (steps S2604 and S2608). The search condition is then included in the search request that is to be transmitted.

That is, the client terminal 111 or 113 issues an inquiry to the server terminal with the search condition expression in FIGS. 13 and 14. When the search expression is stored on the HD 211, this can be employed for the next search, so that the user does not have to re-enter the search condition.

After the client terminal 111 or 113 has transmitted the information at steps S2604 and S2608, it waits to receive the search results from the server terminal 112. At step S2605 a check is performed to determine whether the search results are received, and when at step S2605 the search results shown in FIG. 15 are received, at step S2609, the start level, input as part of the entry 1006 in FIG. 13, for the display of the search results is acquired, and the search results are displayed in accordance with that display start level (step S2606). When another event is received, the other process is performed (step S2607).

The search result display processing will now be described in more detail while referring to FIG. 30.

First, at step S2701, a check is performed to determine whether all the search results have been processed. When all the processes have been completed, the display processing is terminated.

When at step S2701 all the processes have not been completed, program control advances to step S2702, and the hierarchical-type location information is obtained from the received search results. Based on the obtained hierarchical-type location information, a check is performed to determine whether the client terminal can display the map for that information (step S2703).

In this embodiment, the hierarchical-type location information with which the device terminal can be displayed includes the information 1401 in FIG. 17. If the hierarchical-type location information does not include the information 1401, a check is performed to determine whether the unknownMAP has been displayed (step S2709). If the unknownMAP has not yet been displayed, it is displayed in FIG. 22 (step S2710).

Furthermore, the NM information is obtained from the hierarchical-type location information (step S2711), and the device terminal bit map that corresponds to the NM is read from the table in FIG. 23 and displayed in the area 1902 (step S2712). In other words, the device terminal is displayed for which the hierarchical-type location information has not yet been registered.

When, at step S2703, the map can be displayed, the BL information in the hierarchical-type location information is obtained (step S2704). To display a required layout bit map, the client terminal 111 or 113 compares the BL information with the BL information table in FIG. 17.

A check is then performed to determine whether the corresponding layout bit map has been displayed (step S2705). If the corresponding layout bit map has not yet been displayed, this bit map is obtained (step S2706). Then, the NM information and the map information is acquired from the hierarchical-type location information (step S2707).

If, at step S2705, the corresponding layout bit map has been displayed, program control advances to step S2707. In addition, based on information concerning the NM, the device terminal bit map is read from the table in FIG. 23. Further, based on the map information, the location is determined for the device terminal bit map that is to be displayed.

In this embodiment, since the search results in FIG. 15 are returned from the server terminal 112, the device terminal bit map for the LBP 1110, as the NM, is located at the position "10X+10Y" on the map that is displayed at step S2706. Since the device terminal bit map is located at the position shown in FIG. 24, the search results shown in FIG. 25 can be displayed (step S2708).

An example will now be described that concerns a search based on the hierarchical-type location information.

In the above embodiment, as is shown in FIG. 17, the five layout bit maps, which, for the individual blocks, are bit maps 1-1, 1-2, 2-1 and 2-2 and the "unknown" bit map, have been employed. In this example, an explanation will be given for a display method employed by a client when a layout bit map is provided for each rank. This display method includes the display method that was previously described.

FIG. 33 is a diagram showing a MAP list that corresponds to each rank that is to be searched for. The lower half-list in FIG. 33 corresponds to the list in FIG. 17. In this embodiment, the device map is displayed based on the attribute information immediately below the attribute for the rank that is to be searched for. The hierarchical relationship of the ranks in FIG. 4 should be referred to.

To search all the devices for which the condition the Bu=AA Building applies, for example, the attribute FL (see FIG. 4) immediately below that condition is displayed on the layout bit map as location information for the display of the devices. Several examples of this will now be described while referring to the flowchart in FIG. 34.

To search all the devices in the ABC Trading Company, the user selects the company name (0) in the entry 1001*a* from the pull down menu, enters the ABC Trading Company as the attribute value 1002*a*, and clicks on the search start button 1005.

The client obtains from the server the search results provided by the processing explained above, and based on these search results, the client displays the device bit map on the layout bit map.

Figure 34:
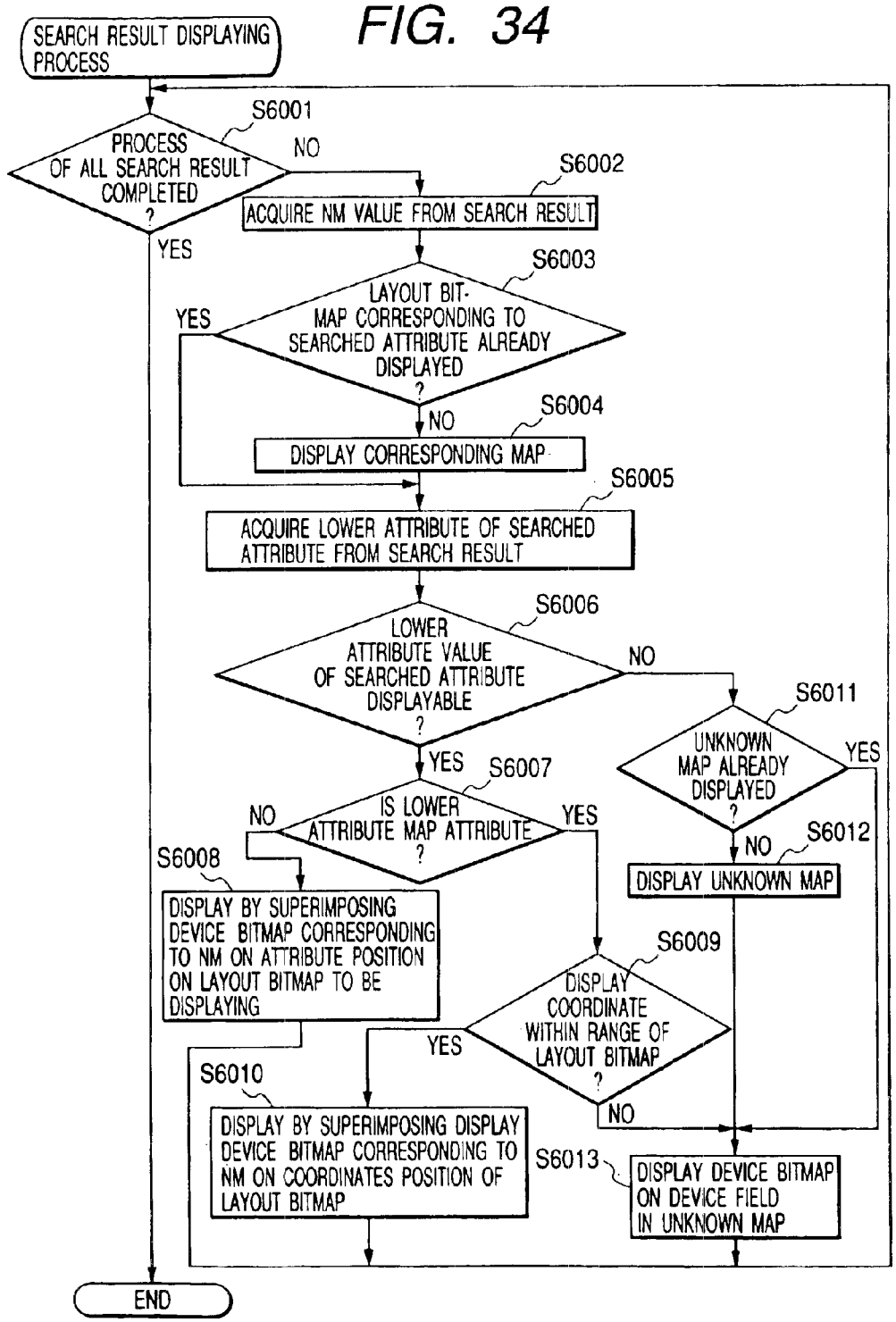
FIG. 34 is a flowchart showing the processing by which a client employs the search results obtained by the server of the first embodiment of the invention to display a device bit map on a layout bit map.

At this time, the display process is performed by the client as is shown by the flowchart in FIG. 34.

Specifically, when the processing is initiated, at step S6001, first a check is performed to determine whether all the search results have been displayed, and if they haven't, the display processing is repeated until all the results have been displayed.

When at step S6001 the search has not yet been completed, at step S6002 the attribute NM is obtained from the search results to display the device bit map at steps S6008, S6010 and S6013.

Then, at step 6003 a check is performed to determine whether the layout bit map that corresponds to the attribute for the search condition has been displayed. In this example, since the search is performed under the attribute 0=attribute value ABC Trading Company, from the MAP list (FIG. 33) the device obtained as a result of the search is displayed on the layout bit map in FIG. 35. That is, at step S6003 a check is performed to determine whether the layout bit map in FIG. 35 has been displayed. When the layout bit map has not yet been displayed, at step S6004 the layout bit map is displayed and program control advances to step S6005.

Figure 35:
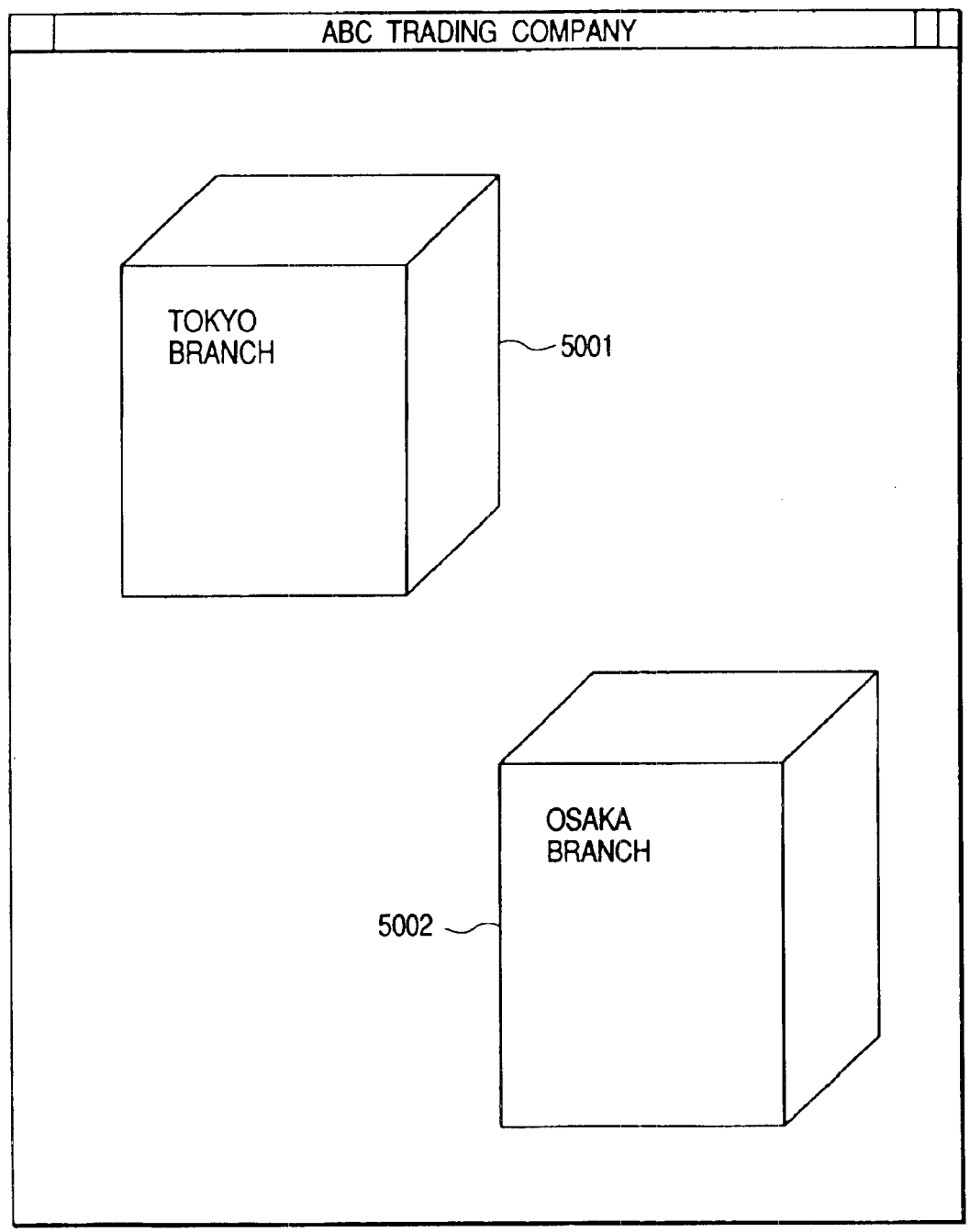
FIG. 35 is a diagram showing a layout bit map that corresponds to the attribute of a condition that is searched for according to the first embodiment of the invention.

When at step 6003 the layout bit map in FIG. 35 has been displayed, at step S6005 an attribute lower than the attribute to be searched for and the attribute value are extracted from the search results, and at step S6006, a check is performed to determine whether the obtained attribute value can be displayed. If it is assumed that a device whose attribute value falls outside the range, and a device whose attribute value has not been entered can not be displayed, program control shifts to step S6011.

At step S6011, a check is performed to determine whether the unknownMAP has been displayed. If the unknownMAP has not yet been displayed, at step S6012 it is displayed, and superimposed on its device column is the device bit map that corresponds to the NM value obtained at step S6002 (step S6013).

Figure 36:
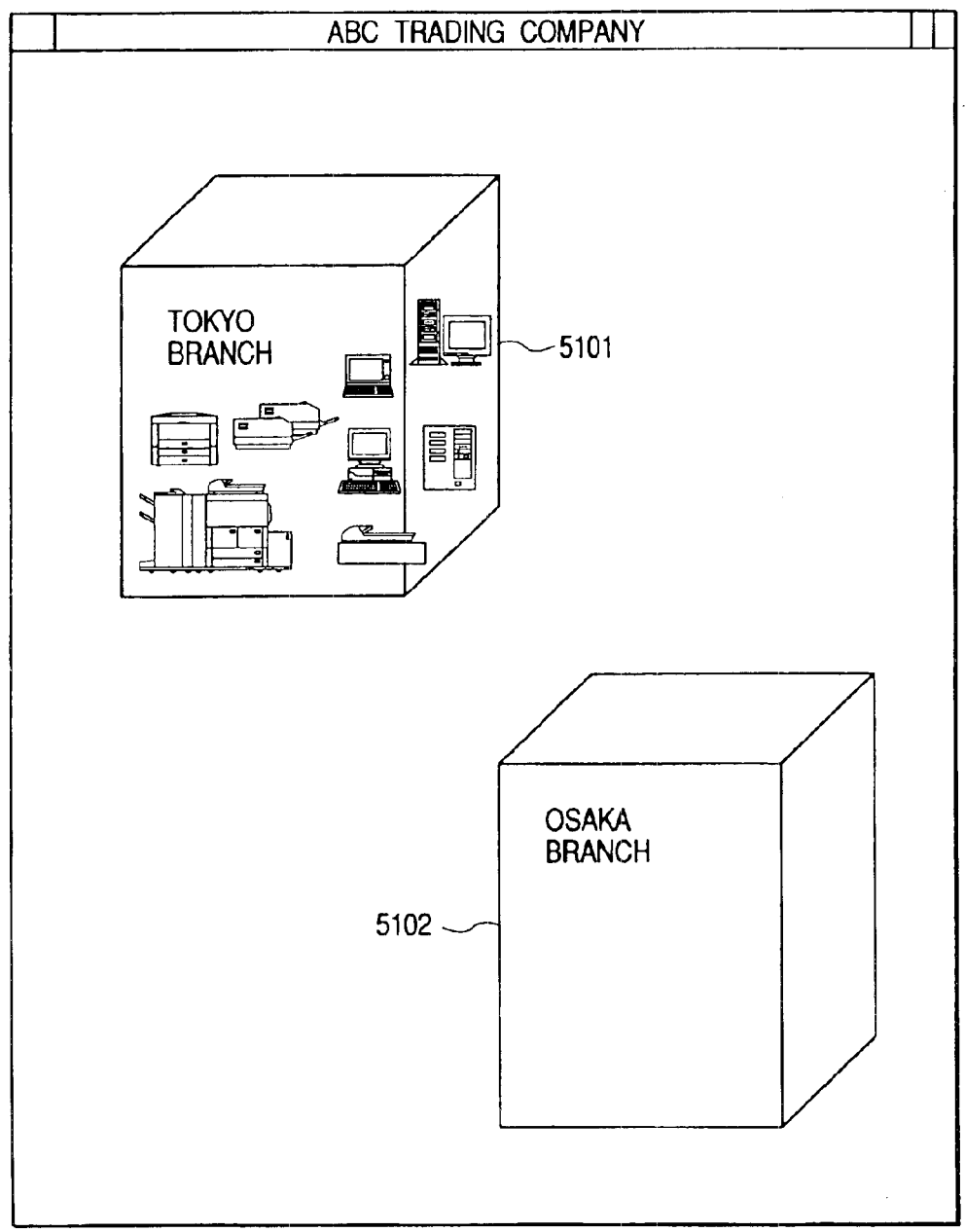
FIG. 36 is a diagram showing an example where the devices of the first embodiment are displayed at the location of the Tokyo branch.

When, at step S6006, the attribute value can be displayed, a check is performed to determine whether the lower attribute is a MAP attribute (step S6007). If the lower attribute is not a MAP attribute, program control advances to step S6008, and the device bit map that corresponds to the NM value obtained at step S6002 is superimposed on it at the attribute position for the layout bit map on the display. In this case, since the attribute value for the rank BR below (0) is the Tokyo branch, according to the hierarchical-type location information (see FIG. 4), each device is displayed at the location of the Tokyo branch 5001. As a result, the display in FIG. 36 is acquired.

To search for a more detailed location for the device, from the pull-down menu the user selects the block name (BL) in the entry 1001a, selects 2-1 as the attribute value 1002a, and clicks on the search start button 1005.

Through the above described processing the client acquires the search results from the server, and based on these search results, the client displays the device bit map on the layout bit map. At this time, the processing in FIG. 34 is also performed, and in this case, since at step S6007 the lower attribute information is MAP information, program control advances to step S6009.

At step S6009, a check is performed to determine whether the range represented by the coordinates for the NM value obtained at S6002 lies within the limits of the layout bit map. If it does, at step S6010 the device bit map that corresponds to the NM value obtained at step S6002 is superimposed on the layout bit map display at the position designated by the coordinate values.

In this case, since the search has been conducted with the attribute BL and the attribute value 2-1, in accordance with the MAP list in FIG. 33, the device obtained by the search is displayed on the layout bit map in FIG. 20.

Because of the MAP below the BL in the hierarchical-type location information (see FIG. 4), all the devices obtained by the search are displayed at specified coordinates on the layout, and the display in FIG. 5 is acquired.

The layout bit map for each rank will now be described.

As previously mentioned, FIG. 35 is a diagram showing the layout bit map used to conduct a search under the attribute 0=attribute value ABC Trading Company. When a device whose attribute BR, below the attribute 0, is the Tokyo branch it is displayed in an area 5001, while when a device whose attribute BR, below the attribute 0, is the Osaka branch it is displayed in an area 5002.

FIG. 36 is a diagram showing the results that are displayed when a search is conducted for all devices under the attribute 0 attribute value ABC Trading Company.

Figure 37:
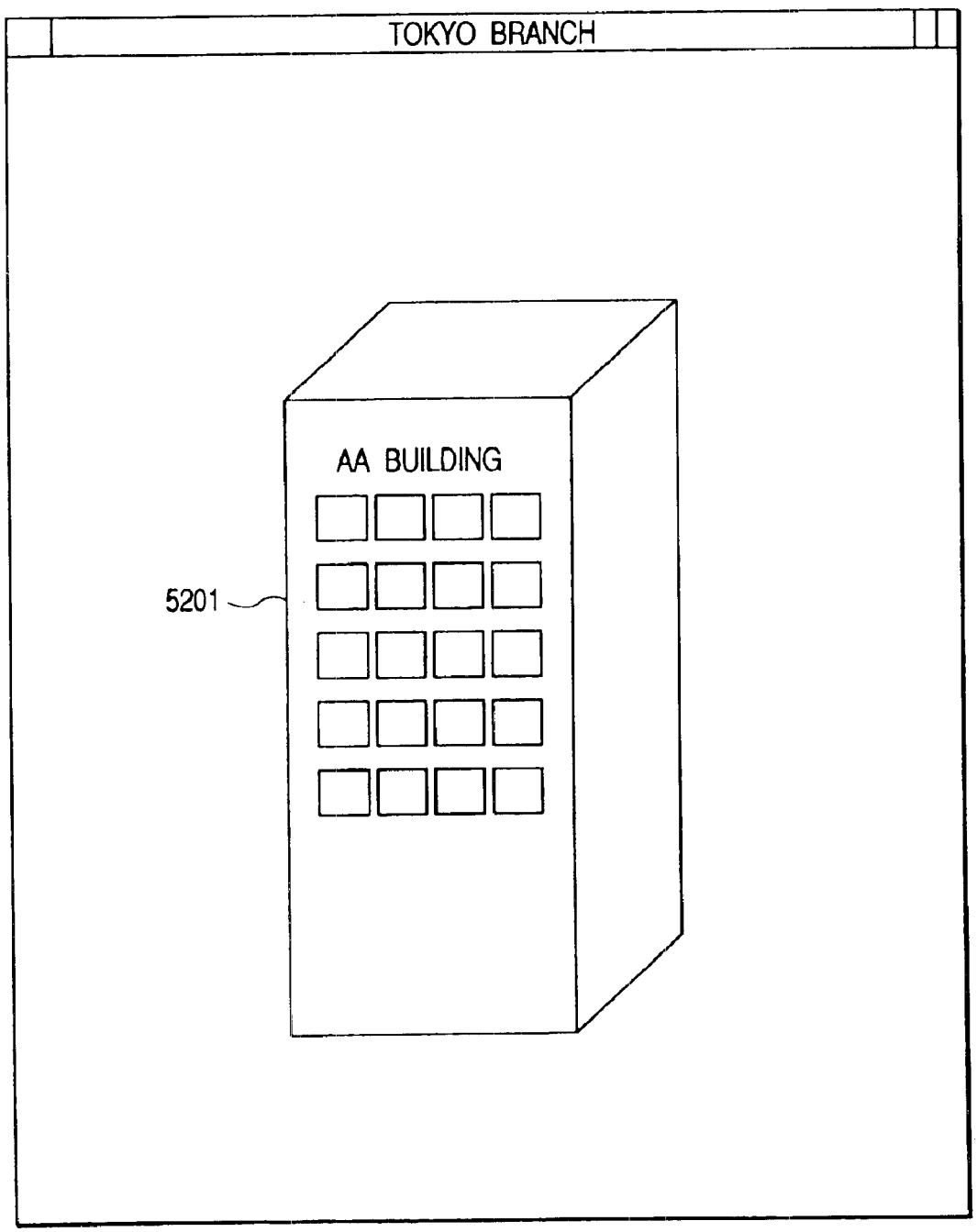
FIG. 37 is a diagram showing a layout bit map when the attribute BR=attribute value Tokyo branch is employed for a search according to the first embodiment of the present invention.

FIG. 37 is a diagram showing a layout bit map used to conduct a search under the attribute BR=attribute value Tokyo branch. The attribute below the attribute value BR is OP, which indicates the presence of OPTION and the presence of detailed information at a lower rank. A device whose attribute BU is the AA Building is displayed in an area 5201.

Figure 38:
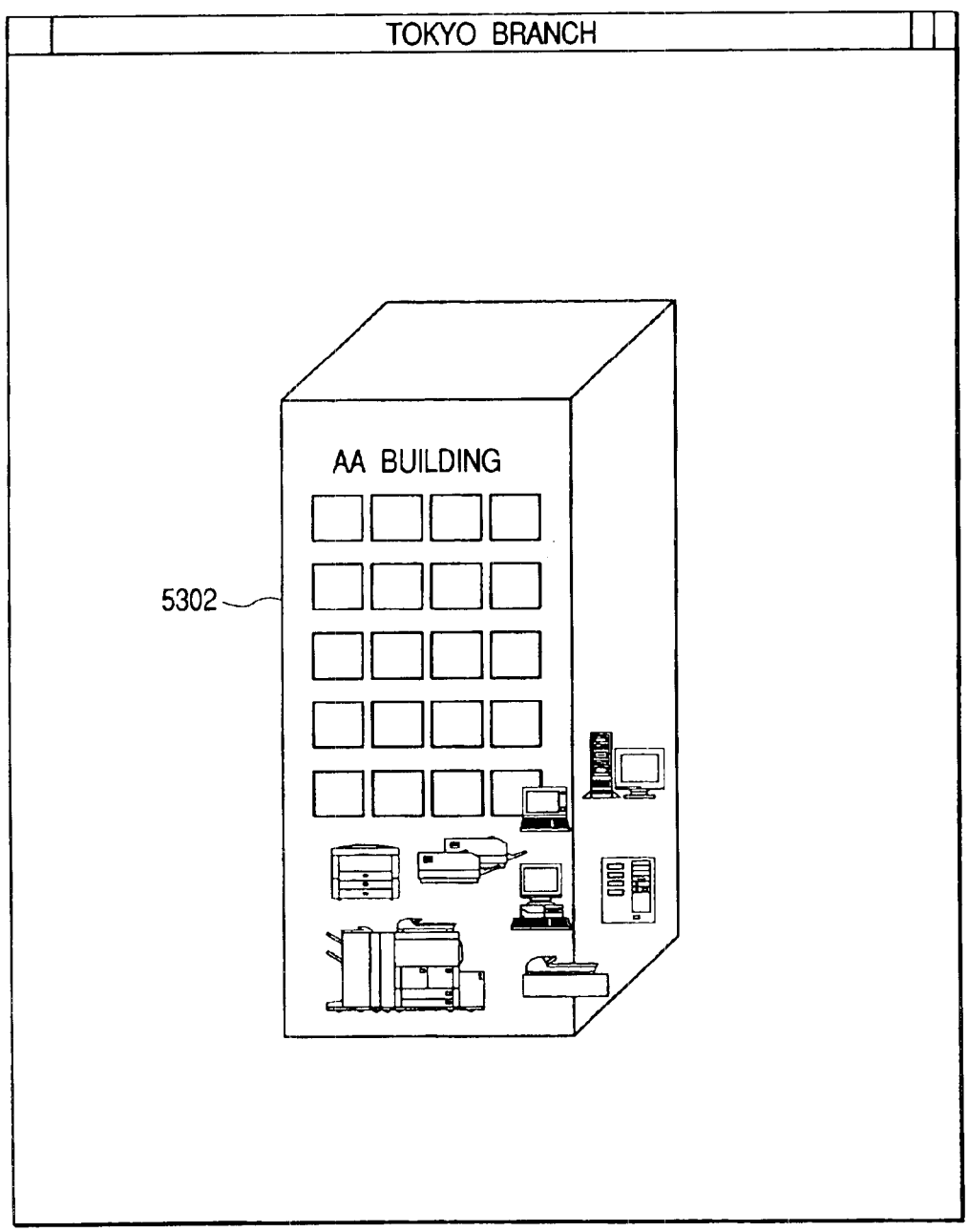

FIG. 38 is a diagram showing the search results obtained when a search is conducted for all devices under the attribute BR=attribute value Tokyo branch.

Figure 39:
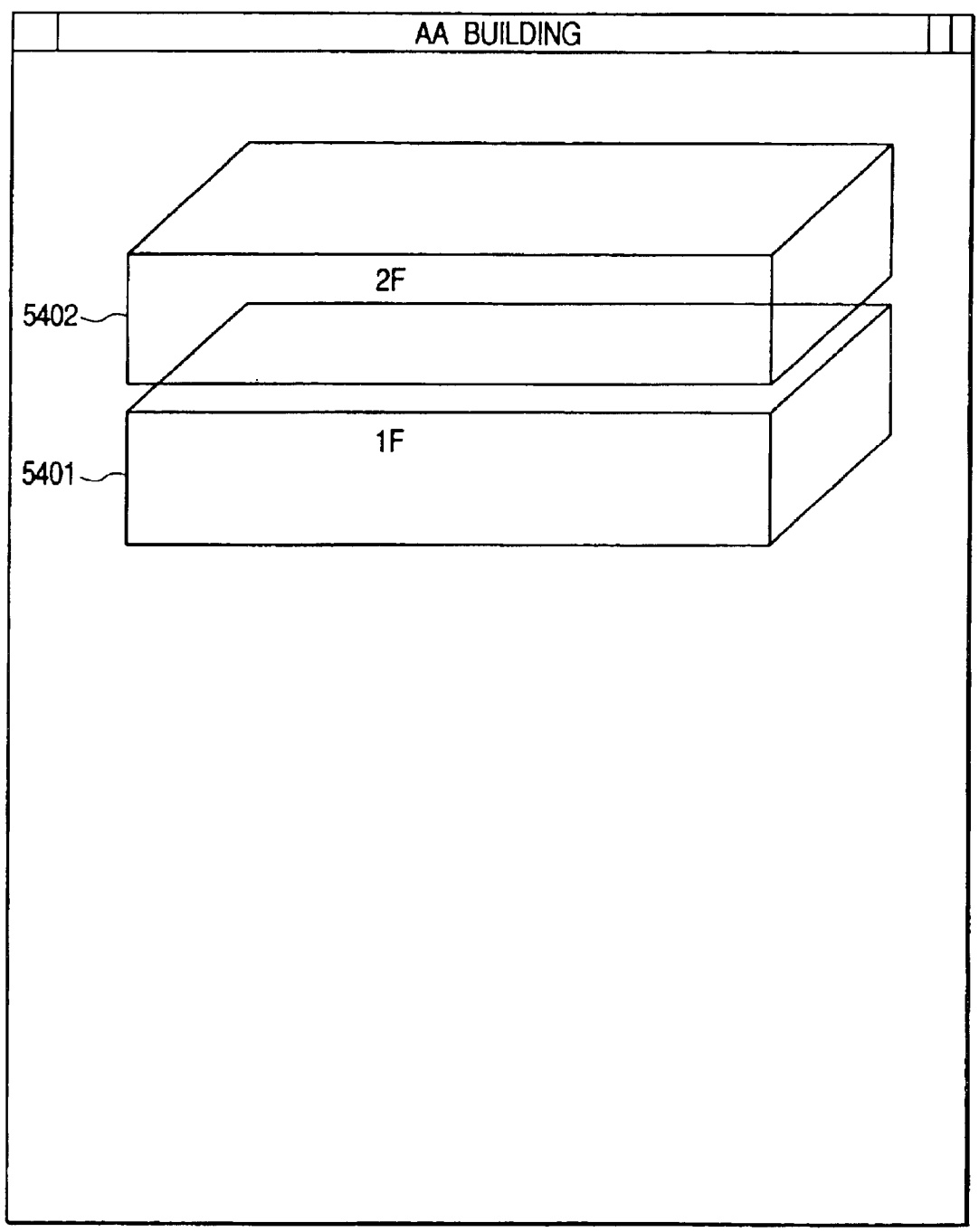
FIG. 39 is a diagram showing a layout bit map when the attribute BU=attribute value AA Building is employed for a search performed according to the first embodiment of the present invention.

FIG. 39 is a diagram showing a layout bit map for performing a search under the attribute BU=attribute value AA Building. A device whose attribute FL, below the attribute BU, is 2F is displayed in a bit map 5402, and a device whose attribute FL is 1F is displayed in a bit map 5401.

Figure 40:
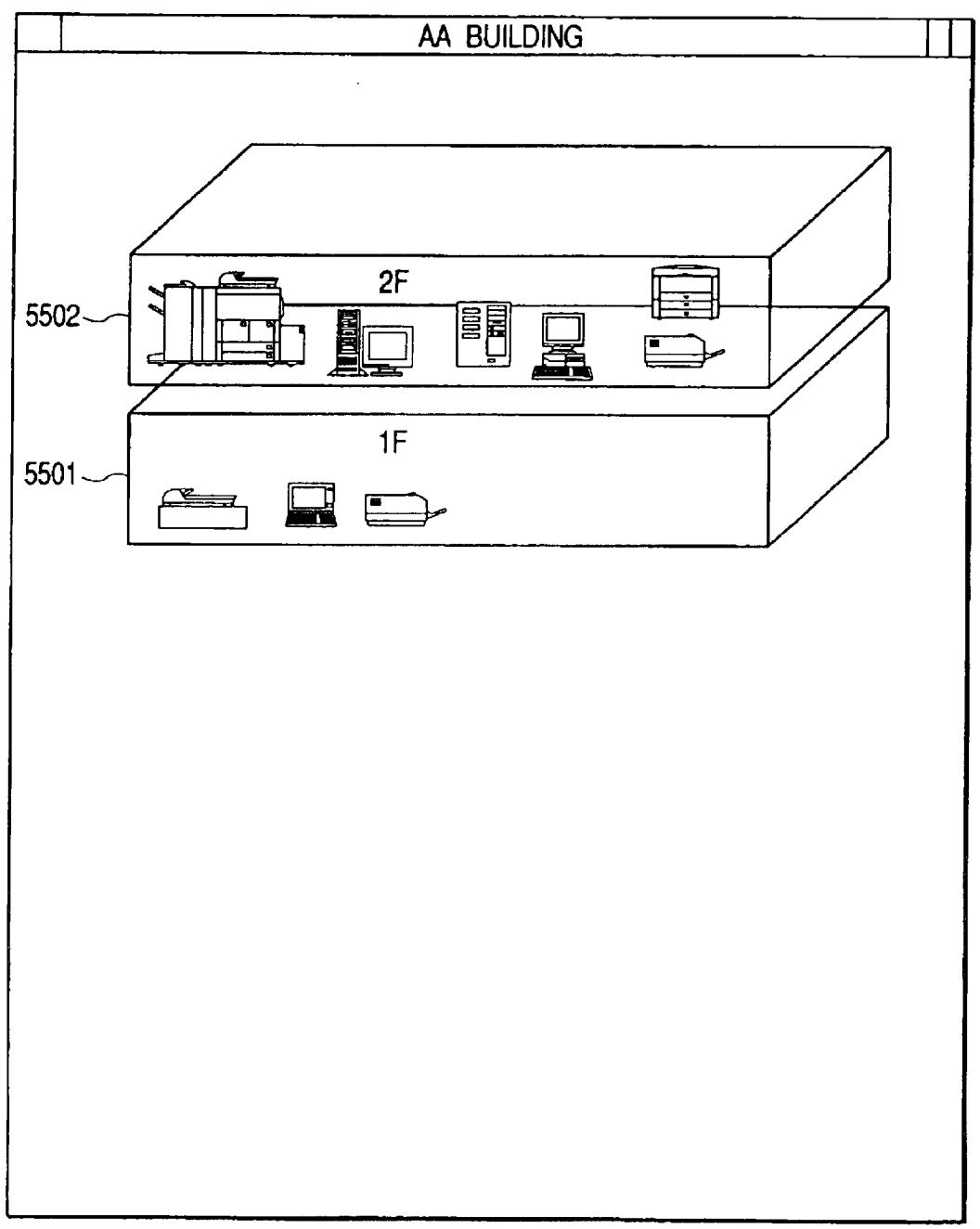
FIG. 40 is a diagram showing the results obtained when a search is performed for all available devices when the attribute BU=attribute value AA Building is employed.

FIG. 40 is a diagram showing the search results obtained when a search is conducted for all devices under the attribute BU=attribute value AA Building. All the devices present in the bit map 5502 for the 2F and all the devices present in the bit map 5501 for the 1F are displayed.

Figure 41:
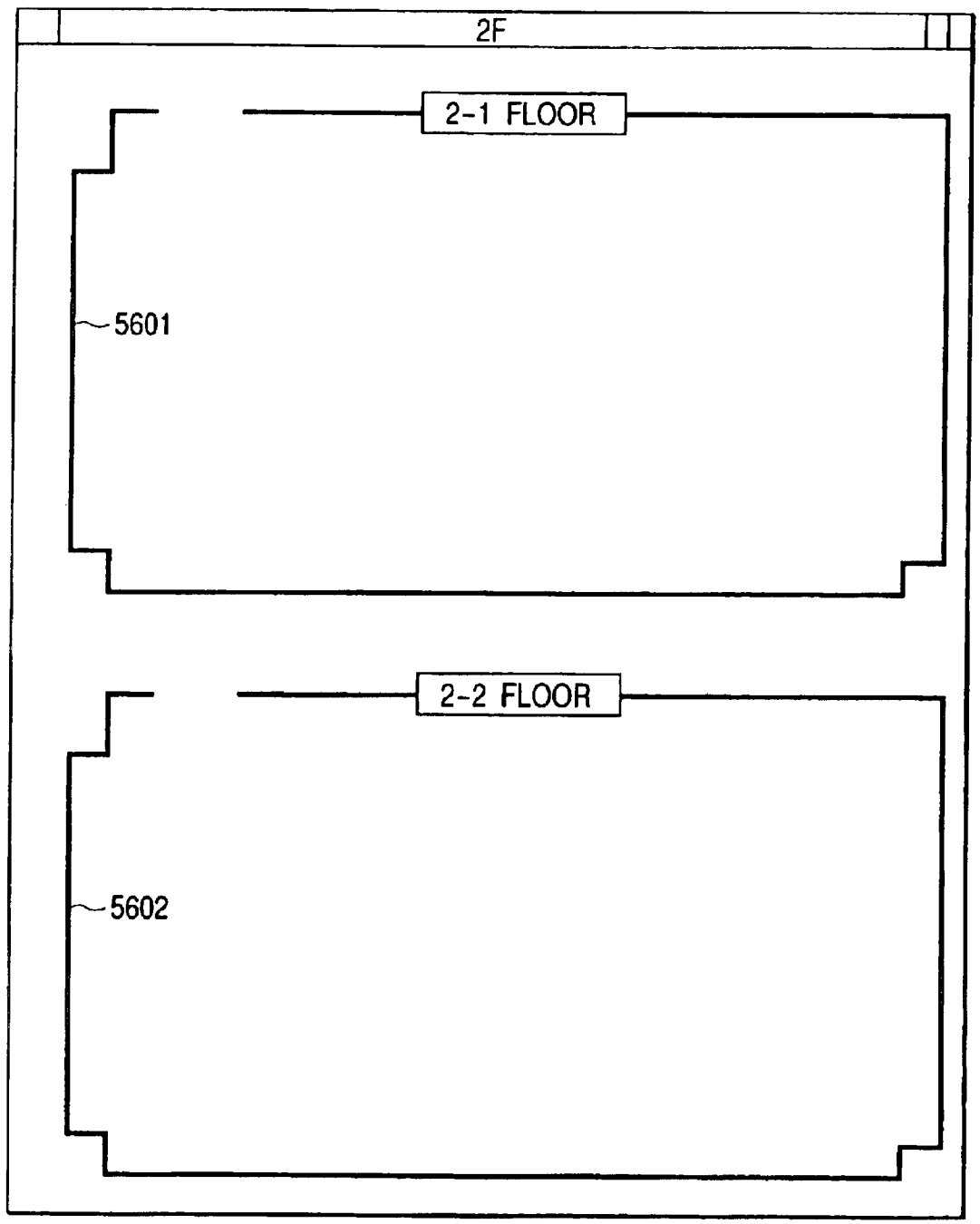
FIG. 41 is a diagram showing a layout bit map when the attribute FL=attribute value 2F is employed for a search according to the first embodiment of the present invention.

FIG. 41 is a diagram showing a layout bit map for performing a search under the attribute FL=attribute value 2F. A device whose attribute BL, below the attribute FL, is 2-1 is displayed in a bit map 5601, and a device whose attribute BL is 2-2 is displayed in a bit map 5602.

Figure 42:
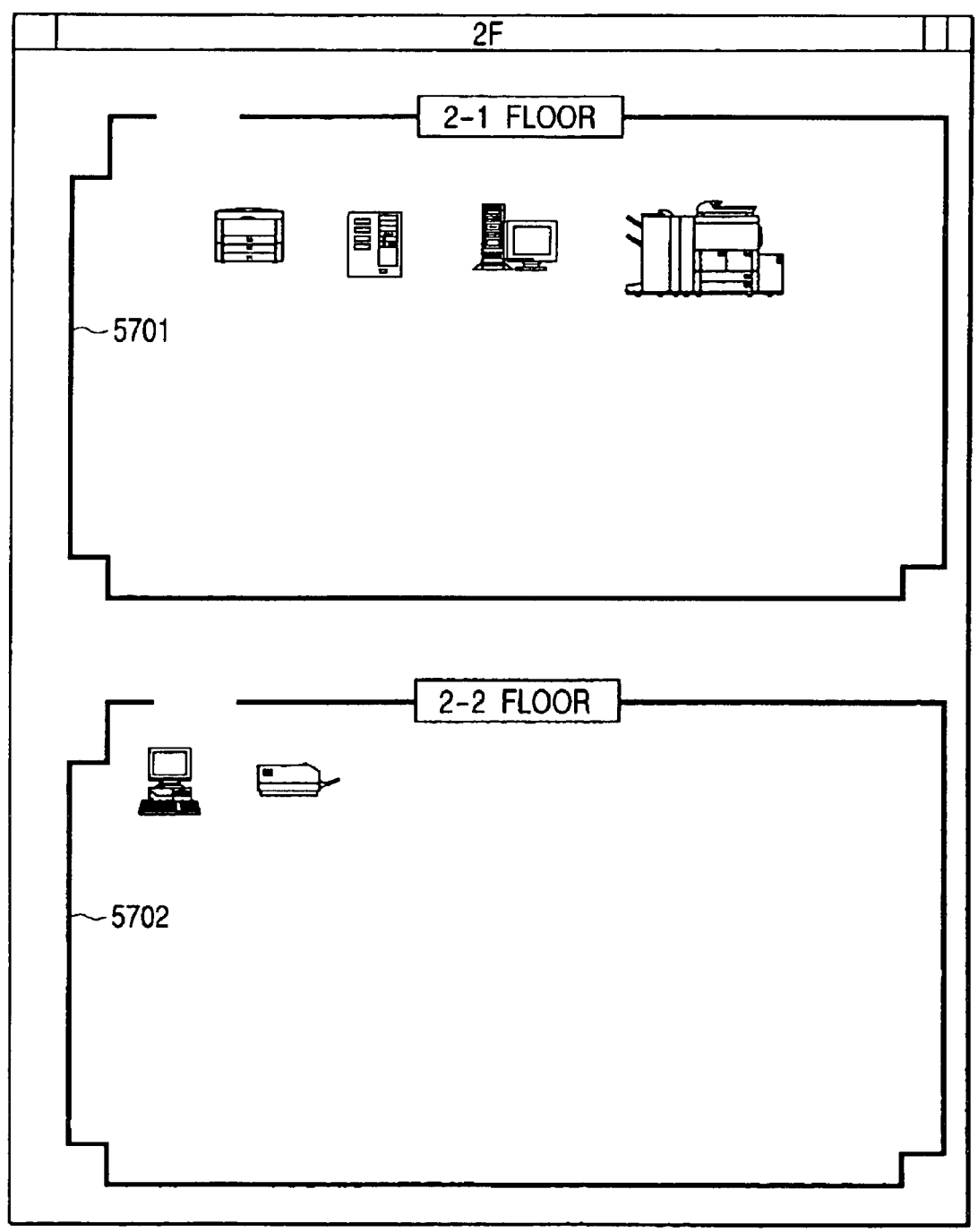
FIG. 42 is a diagram showing the layout bit map when a search for all available devices is performed while the attribute FL=attribute value 2F is employed.

FIG. 42 is a diagram showing the search results obtained when a search is conducted for all devices under the attribute FL=attribute value 2F. All the devices present in the bit map 5701 for the 2F-1 and in the bit map 5702 for the 2F-2 are displayed.

Figure 43:
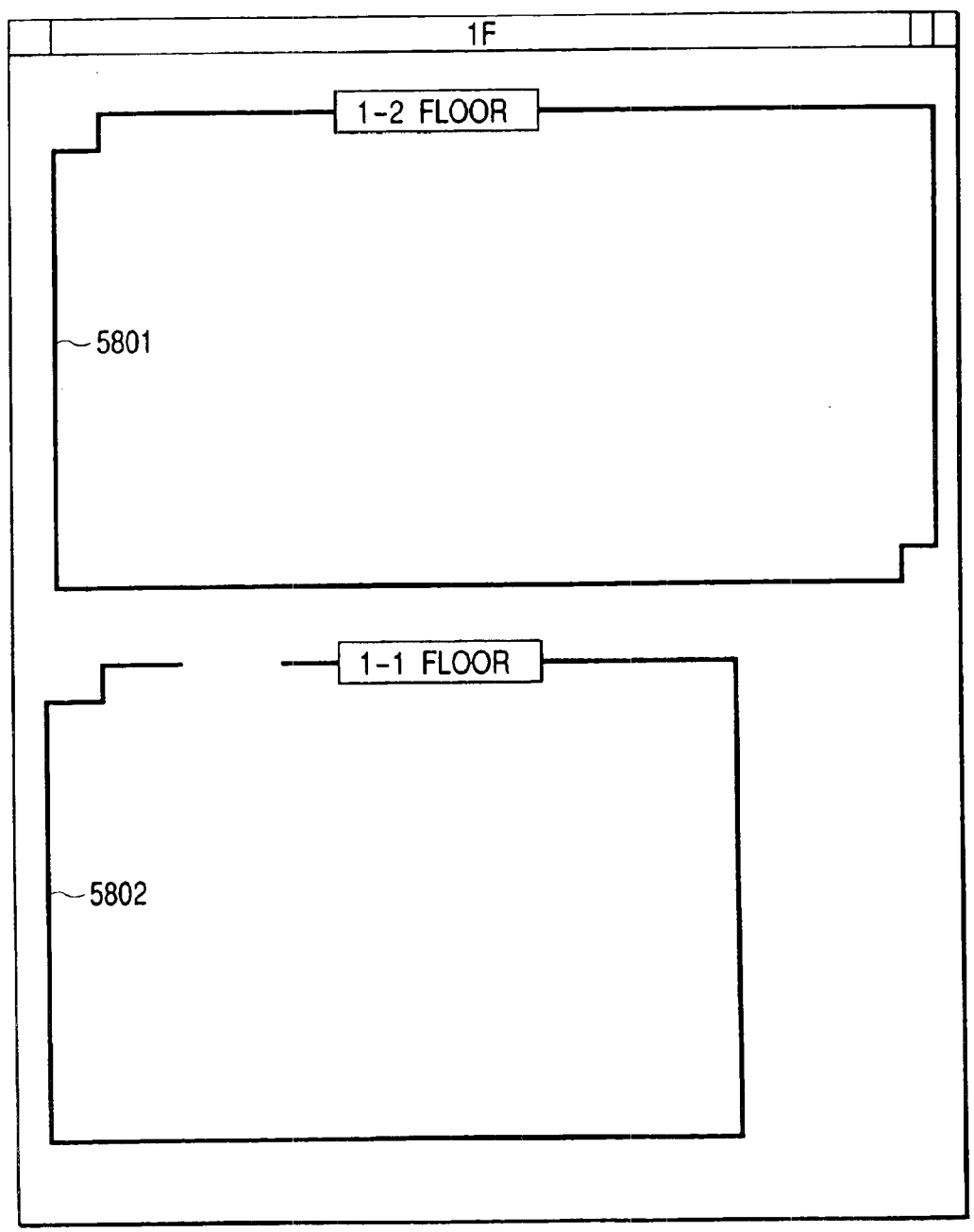
FIG. 43 is a diagram showing the layout bit map when a search is conducted while the attribute FL=attribute value 1F is employed.
Figure 44:
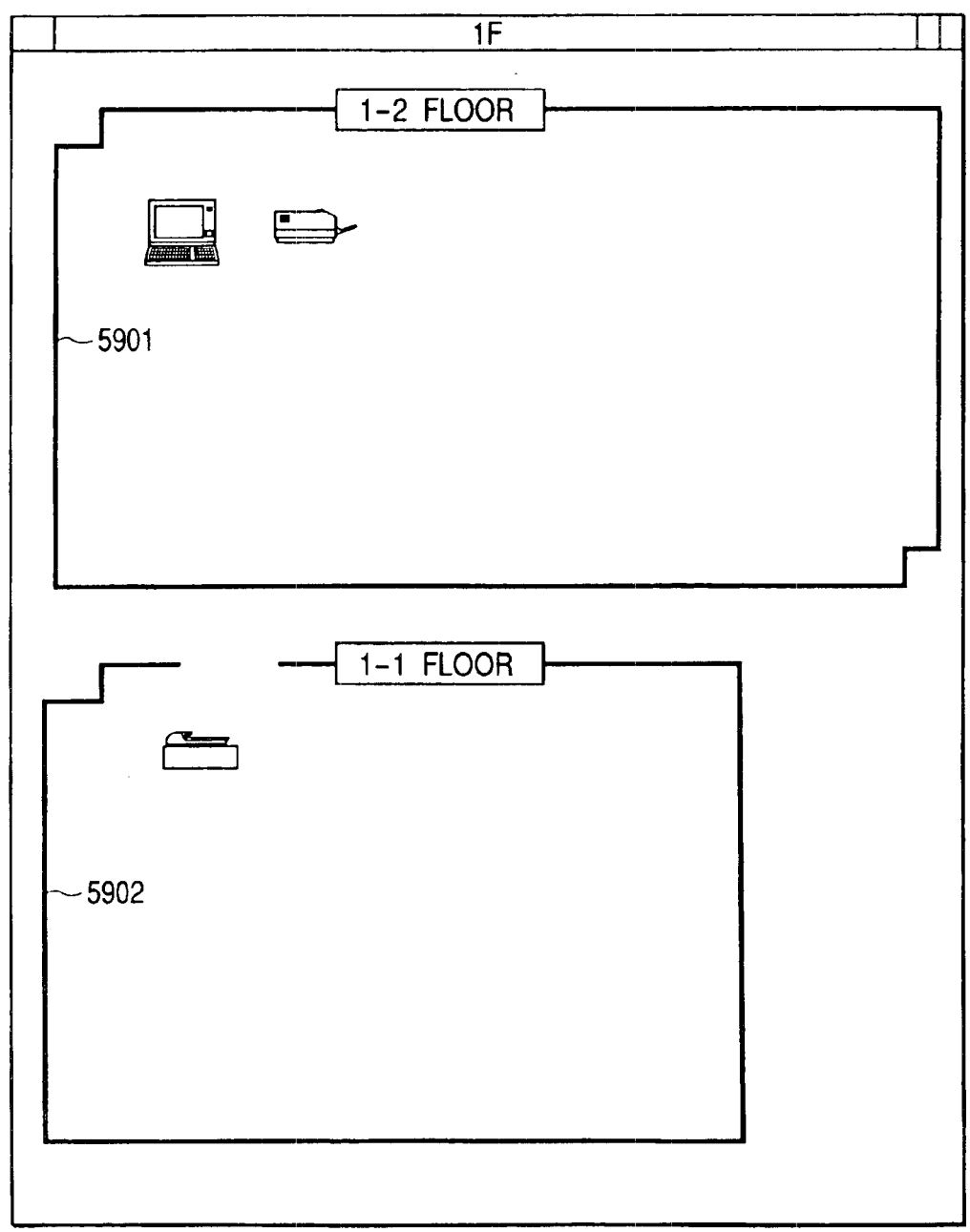
FIG. 44 is a diagram showing the layout bit map when a search for all available devices is performed while the attribute FL=attribute value 1F is employed.

FIG. 43 is a diagram showing a layout bit map for performing a search under the attribute FL=attribute value 1F. FIG. 44 is a diagram showing the search results obtained when a search is performed for all devices under the attribute FL=attribute value 1F. The devices whose attribute BL, below the attribute FL, is 1-2 are displayed in a bit map 5901, and the device whose attribute BL is 1-1 is displayed in a bit map 5902.

As is described above, according to the first embodiment, the search can be conducted in accordance with a search level requested by a user, and the search results can be roughly displayed in detail in accordance with the hierarchical location of the information that is obtained.

(Second Embodiment)

In the first embodiment, the client terminal stores layout bit maps in FIGS. 18 to 21, 35, 37, 39, 41 and 43. However, in a second embodiment, an explanation will be given for a case wherein the server terminal stores these layout bit maps.

Figure 45:
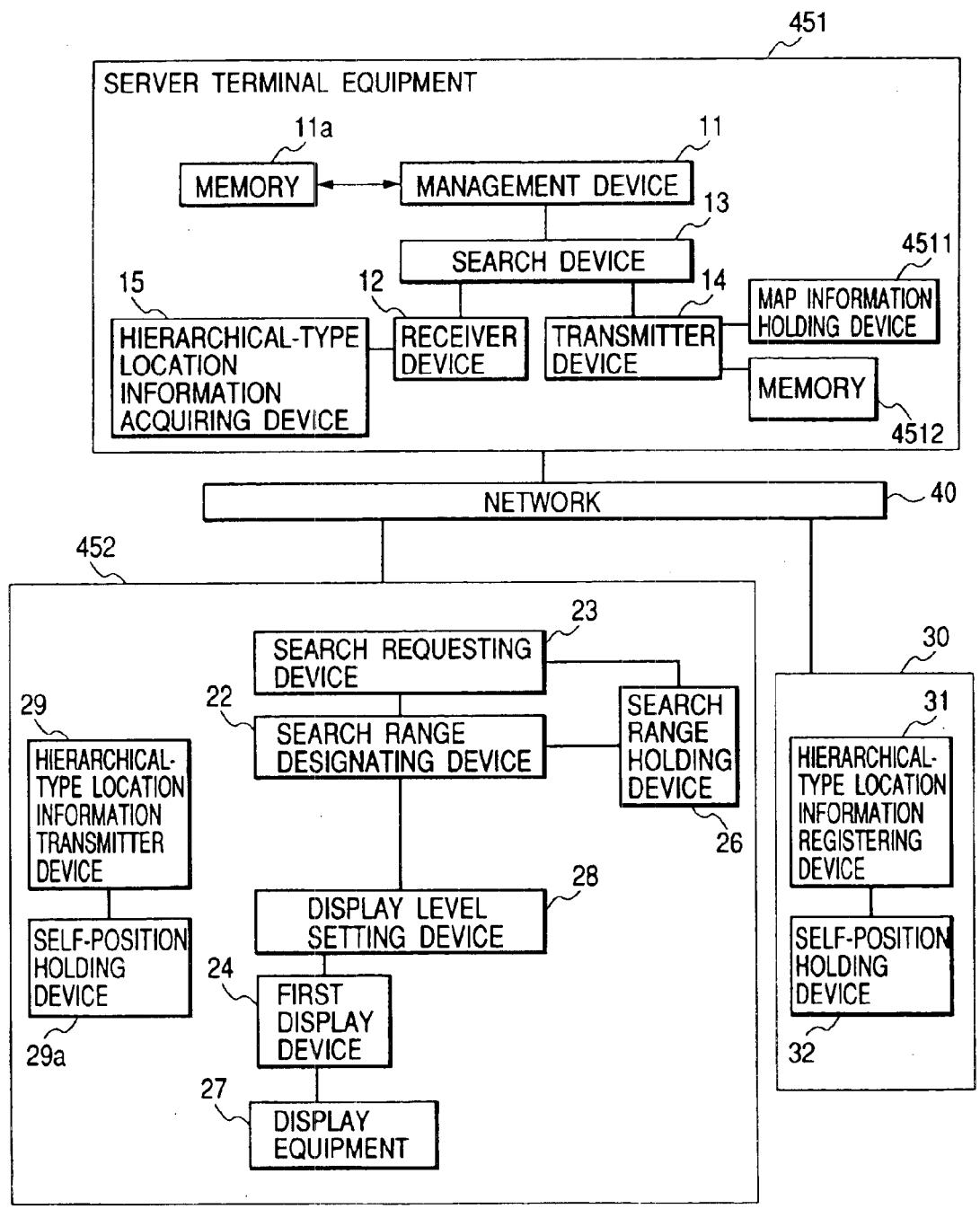
FIG. 45 is a diagram showing the arrangement of a device search system according to a second embodiment of the present invention.

FIG. 45 is a diagram showing the arrangement of a device search system according to this embodiment. In addition to the arrangement of the server terminal 10 in FIG. 1, a server terminal 451 in FIG. 45 includes a map information holding device 4511 that, in addition to the layout bit maps in FIGS. 18 to 21, 35, 37, 39, 41 and 43, stores layout maps for the individual ranks of the overall system, and a memory 4512 in which bit map data representing a device terminals are stored. A client terminal 452 is designed by removing the map data holding device 21, the second display device 25 and the memory 25a from the arrangement for the client terminal 20 in FIG. 1.

Figure 46:
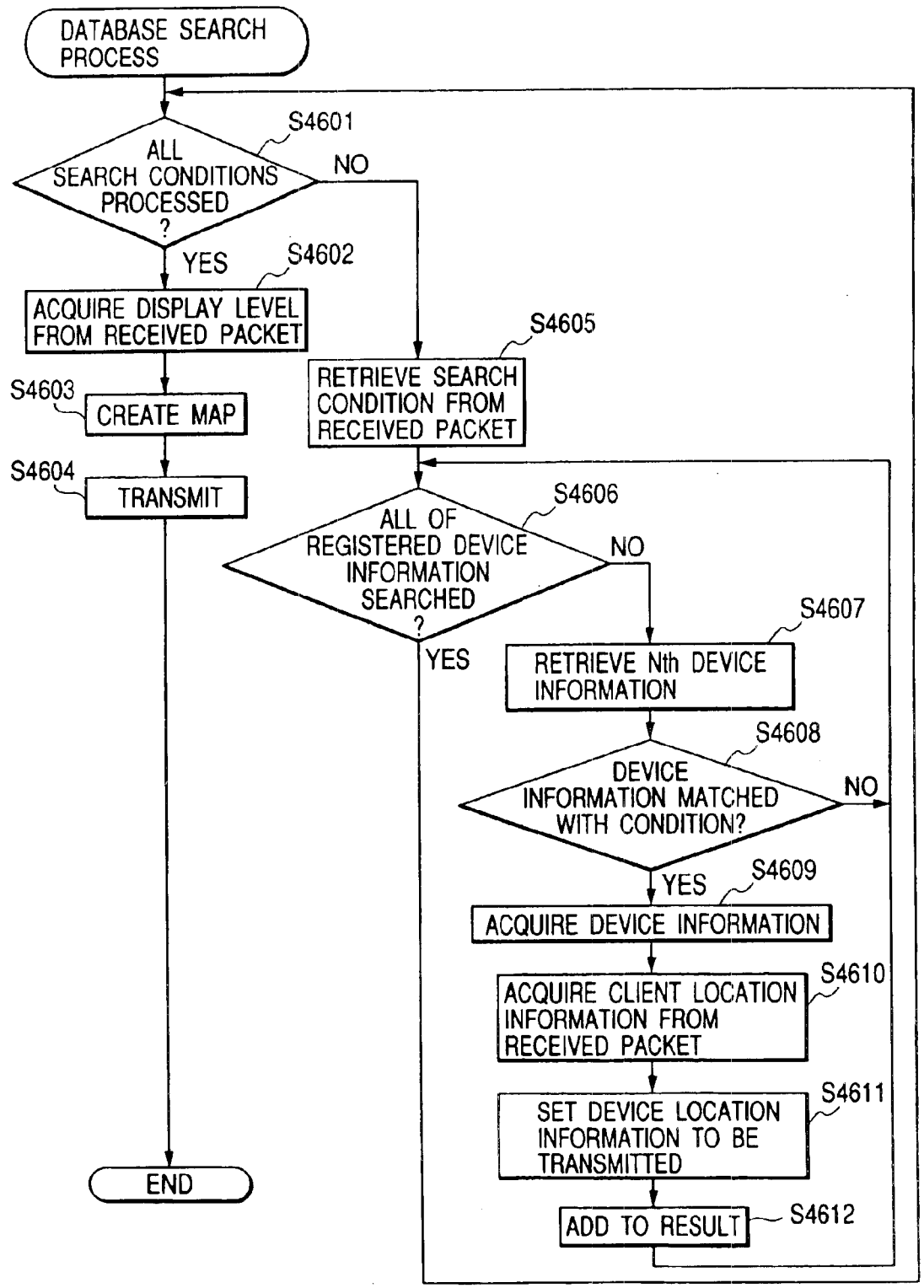
FIG. 46 is a flowchart showing the search processing performed by a server terminal according to the second embodiment of the present invention.

FIG. 46 is a flowchart for explaining the search processing performed by the server terminal 451 according to this embodiment.

In his embodiment, when the client terminal 452 transmits a search request to the server terminal 431, the client also transmits the information that represents the start level (1006 in FIG. 13) that is designated by the client terminal 452 for the display of the search results.

In FIG. 46, at step S4601 a check is performed to determine whether processing has been completed to satisfy all the search conditions. This processing is to be repeated until all the search conditions have been satisfied.

When at step S4601 processing has not yet been completed to satisfy all the search conditions, a search condition (FIG. 14) is extracted from a received packet. Then, a check is performed to determine whether under the search condition all the registered device terminal information has been searched for in the table in FIG. 9 (step S4606). When all the registered device terminal information has been searched for, program control returns to step S4601 to extract the next search condition.

When, at step S4606, a search for all the registered device terminal information has been not been completed, the n-th device information is extracted from the HD 211 (step S4607). Then, a check is performed to determine whether extracted device terminal information matches the search condition (step S4608). When the extracted device terminal information matches the condition, information to that effect is obtained (step S4609), and at step S4610 location information for the client terminal 452 that requested the search is obtained from the received packet. Then, location information is extracted for a device terminal lower than the rank that matches the location information for the client terminal 452, and location information for a device terminal that is found (step S4611) is added to the search results (step S4610).

When, at step S4601, the search has been completed for all the search conditions, information indicating the start level that the client terminal 452 designated for the display of the search results is obtained from the received packet (step S4602). Then, the layout map for the rank that matches the display start level is selected from the map information holding device 4511. In addition, based on the device terminal information obtained as a result of the search, necessary bit map data (bit map data that represent the device terminal) is selected from the memory 4512. Following this, the bit map data are synthesized with the selected layout bit map to create a map for transmission to the client terminal. Subsequently, the hierarchical-type location information for the device terminal obtained as a result of the search is employed for the synthesization of bit map data, and the map prepared at step S4603 is transmitted to the client terminal 452 (step S4604).

As described above, the server terminal 451 of this embodiment searches for the device terminals in accordance with search conditions that are designated by the client terminal 452. And when the server terminal 451 provides the results of the search to the client terminal 452, it prepares a map that matches the display start level for the client terminal 452 and transmits the map to the client terminal 452.

The processing performed by the client terminal 452 of this embodiment will now be described.

Figure 47:
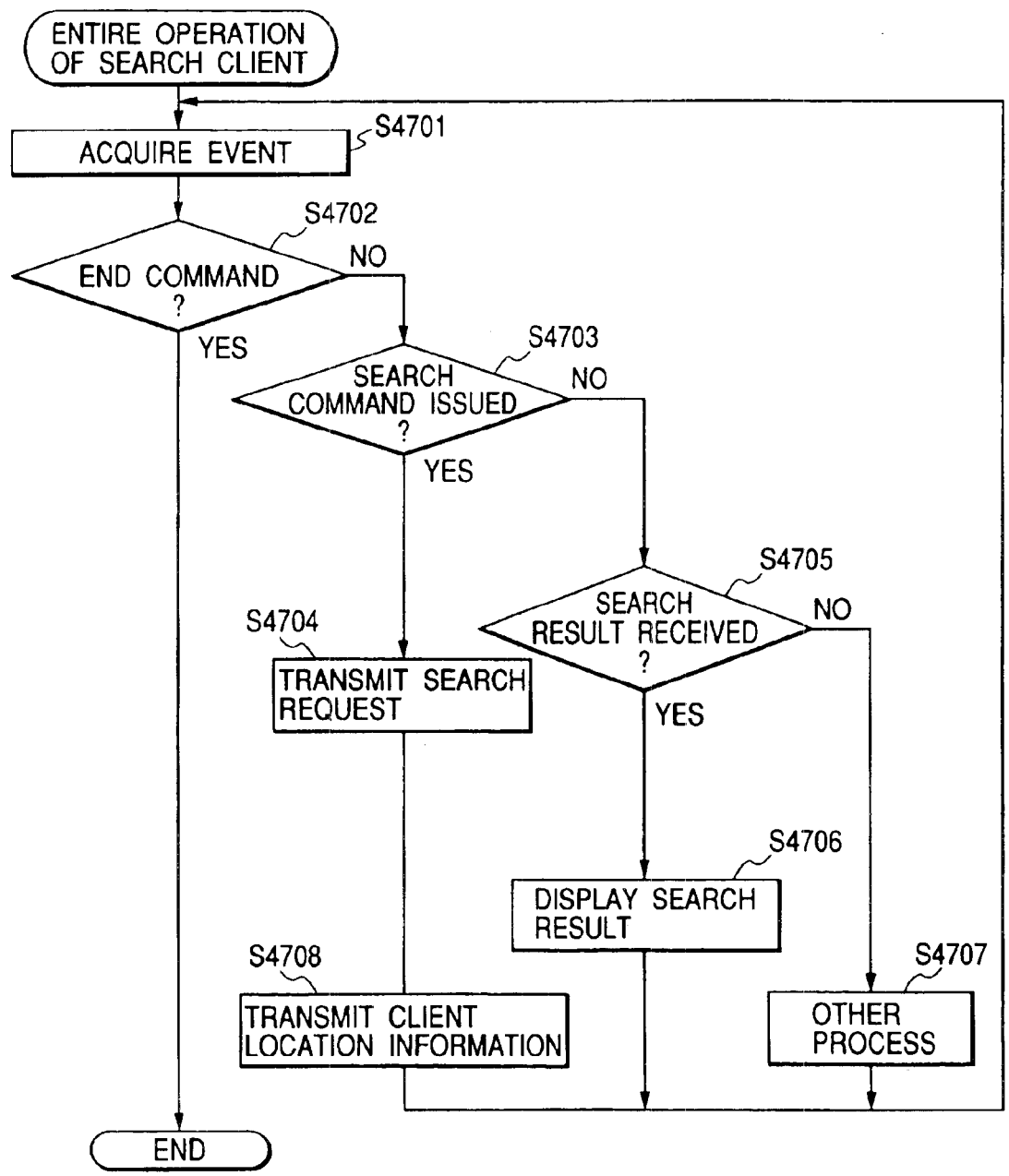
FIG. 47 is a flowchart for explaining the processing performed by a client terminal according to the second embodiment of the present invention.

FIG. 47 is a flowchart for explaining the processing performed by the client terminal 452 according to the embodiment.

The client terminal 452 is constituted by an event-driven program. When an event occurs, the client terminal 452 analyzes the event and performs a corresponding process.

In FIG. 47, at step S4701 the client terminal 452 acquires an event. When the event that is received is an end command, the processing is terminated (step S4702).

But at the client terminal 452, a user can enter a search condition that is displayed on the search condition input screen shown in FIG. 12, and then, when the user clicks on the search start button 1005, a command event occurs requesting that a search command be issued.

When, at step S4703, the command that is entered is a request that a search command be issued, the client terminal 452 transmits a search request to the server terminal 451 (step S4704). The search request includes the search condition designated by the user and the information indicating the start level for the display of the search results. Further, in addition to the search request, hierarchial-type location information for the client terminal 452 is also transmitted (step S4708).

After the client terminal 452 has transmitted the information at steps S4704 and S4708, it waits to receive the search results from the server terminal 451. Then, at step S4704 a check is performed to determine whether the search results have been received. And when it is determined at step S4705 that the result of the search at step S4604 in FIG. 46, i.e., the map, has been received, at step S4706 the received map is displayed on the display unit 27 by the first display device 24. If, however, at step S4705 another event is received, another process is performed (step S4707).

As is described above, according to the second embodiment, since the server terminal prepares a map that matches the display start level of the client terminal and transmits it to the client terminal, the processing load imposed on the client terminal can be reduced.

(Third Embodiment)

In a third embodiment, a device terminal to be employed and the range for the hierarchical location that is to be searched can be limited for each user ID that is employed by users to log in at a client terminal.

The server terminal 112 in this embodiment stores a table in FIG. 48 that represents the rank assigned to each user ID, a table in FIG. 49 that represents the rank of a user ID for which the employment of (the search for) each device terminal is permitted, and a table in FIG. 50 that indicates the hierarchical-type location information that can be searched for by each user ID rank.

In FIG. 48, user IDs ID1 and ID2 belong to rank A, user ID3 belongs to rank C, and user ID4 belongs to rank B. Other user IDs that are not registered in this table are regarded as guest users. The values of the rights accorded the user ID ranks are rank A>rank B>rank C>guests.

According to the table in FIG. 49, the LBP 1110 can be employed by users whose user IDs are ranked equal to or higher than B, i.e., those ranked A and B, and the MFP 6550 can be employed by users whose user IDs are ranked equal to or higher than C, i.e., those ranked A, B and C. The LBP 3310, which is located in the block 2-2 on the second floor (2F) of the AA Building at the Tokyo branch of the ABC Trading company, can be employed by users whose user IDs are ranked equal to or higher than A, i.e., those ranked A, and the LBP 3310, which is located in the block 1-1 on the first floor (1F) of the AA Building at the Tokyo branch of the ABC Trading company, can be employed by users whose user IDs are ranked equal to or higher than that of guest, i.e., those ranked A, B, C and guest. Finally, the SCN 2160 can be employed by users whose user IDs are ranked equal to or higher than C, i.e., those ranked A, B and C.

According to the table in FIG. 50, only users accorded rank A are permitted to search all locations in the ABC Trading Company and in the Tokyo branch of ABC Trading Company; users accorded a rank equal to or higher than B, i.e., those ranked A and B, are permitted to search all of the AA Building of the Tokyo branch of the ABC Trading Company; users accorded a rank equal to or higher than C, i.e., those ranked A, B and C, are permitted to search the entire first floor (1F), the entire second floor (2F), the 1F block 1-2 and the 2F blocks 2-1 and 202 of the AA Building of the Tokyo branch of the ABC Trading Company; and users accorded a rank equal to or higher than guest, i.e., those ranked A, B, C and guest, are permitted to search the 1F block 1-1 of the AA Building of the Tokyo branch of the ABC Trading Company.

In this embodiment, when logging in at a client terminal, the user enters his or her user ID and the client terminal stores the user ID. Then, when at step S2604 in FIG. 29 the client terminal transmits a search request to a server terminal, the client terminal also transmits the user ID stored in the owner location 713 in FIG. 11.

Thereafter, the server terminal determines the rank of the user in accordance with the user ID it received, and conducts a search based on the obtained rank. That is, during the search process in FIG. 28, the server terminal performs a search within the hierarchical location search range authorized for the rank of the user ID received from the client terminal, and transmits the search results to the client terminal.

In the first, the second and the third embodiments, the search range (e.g., FL=2 in FIG. 14) has been designated in the search request transmitted by the client terminal. But if the search range is not included in the search request, the server terminal performs a search of the entire available search range. In this case, when the search results that are designated by the display start level 1006 in FIG. 13 and that fall within the range that can be displayed by the client terminal are transmitted by the server terminal to the client terminal, the traffic on the network can be reduced. Further, when the data transmission capacity of a network is large, all the search results may be transmitted by the server terminal to the client terminal, and may be displayed at the designated display start level.

The above embodiments may be applied to a system constituted by a plurality of apparatuses (e.g., a host computer, an interface device, a reader and a printer) or to a single apparatus.

The device terminal control program on the network according to the above described embodiments may be executed by a PC 200 while it employs an externally installed program. In this case, the program may be loaded into the PC 200 by reading it from a storage medium, such as a CD-ROM, a flash memory or a floppy disk, or for e-mail or PC communications, it may be read from an external storage medium and transmitted across a network.

Figure 32:
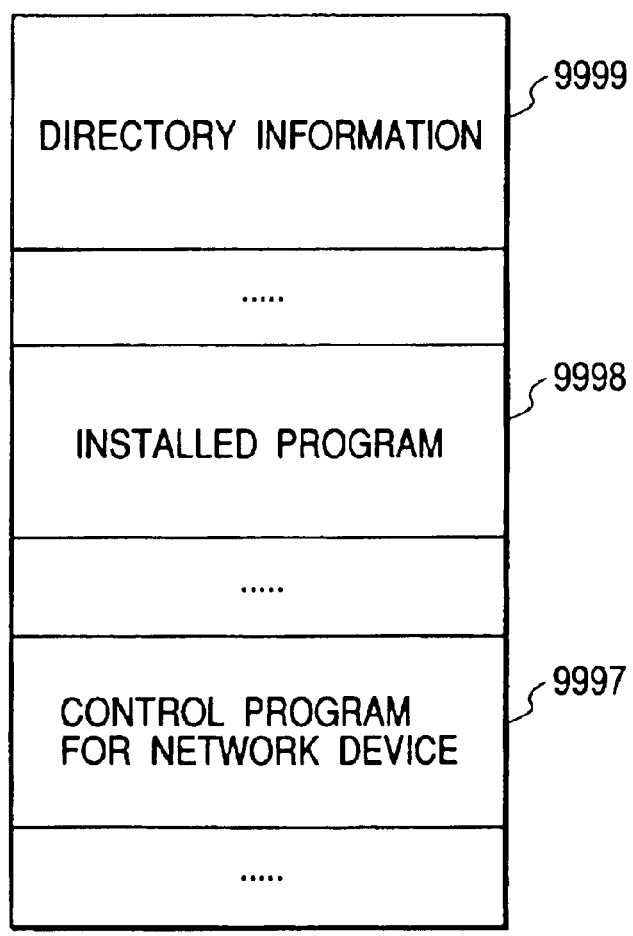
FIG. 32 is a diagram for explaining a memory map for a CD-ROM according to the first embodiment of the present invention.

FIG. 32 is a diagram showing a memory map for a CD-ROM that constitutes an example storage medium.

In FIG. 32, directory information is stored in an area 9999, and represents an area 9998, in which an installation program is stored, and an area 9997, in which a network device terminal control program is stored.

The area 9998 is used to store the installation program, while the area 9997 is used to store the network device terminal control program. When the network control program for these embodiments is to be installed in the PC 200, first, the installation program in the area 9997 is loaded into the system and is executed by the CPU 202.

Then, the installation program executed by the CPU 202 reads the network device terminal control program from the area 9997, and stores it on the hard disk 211.

In addition, the present invention includes not only a case wherein the functions in the previous embodiments can be performed when program code is read and executed by the computer, but also a case wherein, in accordance with an instruction in the program code, in an OS (Operating System) running on the computer or in another application software program the computer interacts with program code to accomplish the functions of the above embodiments.

Furthermore, the present invention includes a case wherein program code, read from a storage medium, is written in a memory that is mounted on a function expansion board inserted into a computer, or on a function expansion unit connected to a computer, and in consonance with a program code instruction, a CPU mounted on the function expansion board or in the function expansion unit performs one part, or all, of the actual processing in order to implement the functions in the above described embodiments.

As is described above, according to the present invention, the device terminals can be searched for based on the hierarchical-type location information that hierarchically represents the locations of the device terminals. Further, the search results can be displayed based on the locations of the device terminals. Therefore, the client terminal can obtain hierarchical-type location information for the device terminals that matches the search conditions designated by a user, and can also display the information on the layout map. Thus, the user can easily understand the hierarchical locations of the individual device terminals.

In addition, in accordance with the location information of the client terminal, the search results for the device terminals are restricted, so that the amount of search result data that must be transmitted by the server terminal can be minimized. Accordingly, the traffic on a network system and the time required to display search results can be reduced, and the results desired by the a can be rapidly and precisely provided.

Furthermore, since only devices that are available in accordance with attributes submitted by a user are displayed, the usability in this sense is also improved. And furthermore, management of the device can be provided while taking security into account.

What is claimed is:

1. An information processing apparatus comprising:
    a storage arranged to store location information of a plurality of devices;
    a receiver arranged to receive location information which is input as a search condition by a user in order to search for a predetermined device and which is transferred from another information processing apparatus;
    a retriever arranged to retrieve location information which represents a location of said another information processing apparatus;
    a searcher arranged to search for a device in accordance with the location information input as the search condition received by said receiver, the location information of said another information processing apparatus retrieved by said retriever, and the location information of the plurality of devices stored in said storage; and
    a transmitter arranged to transmit device information searched by said searcher to said another information processing apparatus.

2. An information processing apparatus according to claim 1, wherein the location information received by said receiver as the search condition is information which designates a first area, the location information which represents the location of the another information processing apparatus retrieved by said retriever is information which designates a second area, and said searcher searches for a device having location information which designates said first area and said second area.

3. An information processing apparatus according to claim 1, wherein the device information transmitted by said transmitter includes identification information of the device and the location information of the device, and the transmitted location information is designated by a plurality of hierarchies.

4. An information processing apparatus according to claim 3, further comprising a generator arranged to generate map information by selecting any of the plurality of hierarchies which designate the location information of the device searched by said searcher,
    wherein said transmitter transmits the map information generated by said generator to the another information processing apparatus.

5. An information processing apparatus comprising:

a first transmitter arranged to transmit location information input as a search condition by a user in order to search for a predetermined device;

a second transmitter arranged to transmit location information which represents a location of said information processing apparatus; and a receiver arranged to receive search results of a device that is searched in accordance with the location information input as the search condition transmitted by said first transmitter and the location information of the information processing apparatus transmitted by said second transmitter.

6. An information processing apparatus according to claim 5, wherein the location information input as the search condition transmitted by said first transmitter is information which designates a first area, the location information which represents the location of the information processing apparatus transmitted by said second transmitter is information which designates a second area and a third area, and said reception means receives the search results comprising a device having the location information which designates said first area and said second area.

7. An information processing apparatus according to claim 6, wherein said second area includes said first area and said third area.

8. An information processing apparatus according to claim 5, wherein said search results include identification information of the device and the location information of the device, and the location information of the device is designated by a plurality of hierarchies.

9. An information processing apparatus according to claim 8, further comprising:

a selector arranged to select any of the hierarchies which designate the location information of the device of the search results received by said reception means; and a display arranged to display the hierarchy selected by said selection means as a map.

10. An information processing apparatus according to claim 8, further comprising a display arranged to display the hierarchy selected by a user, among the location information of the devices in the search results received by said reception means.

11. A method of searching for a device, comprising:

a reception step of receiving location information which is input as a search condition by a user in order to search for a predetermined device and which is transferred from another information processing apparatus;

a retrieval step of retrieving location information which represents a location of said another information processing apparatus;

a search step of searching for a device in accordance with the location information input as the search condition received in said reception step, the location information of said another information processing apparatus retrieved in said retrieval step; and a transfer step of transferring device information searched in said search step to said another information processing apparatus.

12. A method of searching for a device, comprising:

a first transfer step of transferring location information input as a search condition by a user in order to search for a predetermined device;

a second transfer step of transferring location information which represents a location of an information processing apparatus; and a reception step of receiving search results of a device that is searched in accordance with the location information input as the search condition transferred by said first transfer step and the location information of the information processing apparatus transferred by said second transfer step.

13. A computer-executable program for causing a computer to execute said program comprising:

a reception step of receiving location information which is input as a search condition by a user in order to search for a predetermined device and which is transferred from another information processing apparatus;

a retrieval step of retrieving location information which represents a location of said another information processing apparatus;

a search step of searching for a device in accordance with the location information input as the search condition received in said reception step, and the location information of said another information processing apparatus retrieved in said retrieval step; and a transfer step of transferring device information searched in said search step to said another information processing apparatus.

14. A computer-executable program including program codes for causing a computer to execute said program comprising:

a first transfer step of transferring location information input as a search condition by a user in order to search for a predetermined device;

a second transfer step of transferring location information which represents a location of an information processing apparatus; and a reception step of receiving search results of a device that is searched in accordance with the location information input as the search condition transferred by said first transfer step and the location information of the information processing apparatus transferred by said second transfer step.

* * * * *